(12) United States Patent
Choi et al.

(10) Patent No.: US 12,530,166 B2
(45) Date of Patent: Jan. 20, 2026

(54) IMAGE DISPLAY DEVICE

(71) Applicant: LG ELECTRONICS INC., Seoul (KR)

(72) Inventors: Sanghoon Choi, Seoul (KR); Yonghyun Kim, Seoul (KR); Soyoung Jeong, Seoul (KR); Sewon Kim, Seoul (KR); Wookjin Shim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/291,785

(22) PCT Filed: Jul. 28, 2021

(86) PCT No.: PCT/KR2021/009797
§ 371 (c)(1),
(2) Date: Jan. 24, 2024

(87) PCT Pub. No.: WO2023/008605
PCT Pub. Date: Feb. 2, 2023

(65) Prior Publication Data
US 2024/0256211 A1    Aug. 1, 2024

(51) Int. Cl.
*G06F 3/147* (2006.01)
(52) U.S. Cl.
CPC ................... *G06F 3/147* (2013.01)
(58) Field of Classification Search
CPC .. G06F 3/147; G06F 13/4265; G06F 13/4282; G06F 13/4009; G06F 13/4291;
(Continued)

(56) References Cited

U.S. PATENT DOCUMENTS

2002/0044147 A1    4/2002   Martin
2002/0163598 A1*  11/2002   Pasqualino ............. H03L 7/085
                                                        375/E7.274
(Continued)

FOREIGN PATENT DOCUMENTS

JP    2021-007266    1/2021
KR    10-1505669     3/2015
(Continued)

OTHER PUBLICATIONS

PCT International Application No. PCT/KR2021/009797, International Search Report dated Apr. 27, 2022, 6 pages.
(Continued)

*Primary Examiner* — Hong Zhou
(74) *Attorney, Agent, or Firm* — LEE, HONG, DEGERMAN, KANG & WAIMEY

(57) ABSTRACT

An image display apparatus is disclosed. The image display apparatus includes image display apparatus includes: a display; and a signal processing device configured to output data to the display, wherein a first interface in the signal processing device is configured to transmit the data to a second interface in the display by using a plurality of first direction communication lanes, and receive data from the second interface in the display by using at least one second direction communication lane. Accordingly, it is possible to perform data transmission in the direction of the display and data transmission in the direction of the signal processing device, through one cable.

15 Claims, 23 Drawing Sheets

(58) Field of Classification Search
CPC ............. H04N 21/426; H04N 21/4363; H04N 21/43632; H04N 21/4662; G09G 5/006
See application file for complete search history.

(56) References Cited

U.S. PATENT DOCUMENTS

| | | | |
|---|---|---|---|
| 2009/0177818 A1* | 7/2009 | Shim | G09G 5/006 710/100 |
| 2009/0245345 A1 | 10/2009 | Lee et al. | |
| 2010/0269137 A1* | 10/2010 | Nakajima | H04N 1/00299 725/39 |
| 2011/0069647 A1* | 3/2011 | Shao | G09G 5/006 370/310 |
| 2014/0146058 A1* | 5/2014 | Jeong | G09G 5/006 345/520 |
| 2014/0146187 A1* | 5/2014 | Ju | G06F 3/14 348/207.1 |
| 2014/0173360 A1* | 6/2014 | Lee | G06F 11/3041 714/47.1 |
| 2015/0295978 A1* | 10/2015 | Yi | H04L 65/61 370/474 |
| 2016/0119577 A1* | 4/2016 | Jung | H04N 5/46 348/558 |
| 2018/0114504 A1* | 4/2018 | Zhang | G09G 5/008 |
| 2018/0267661 A1* | 9/2018 | Suzuki | G09G 5/006 |
| 2021/0297627 A1 | 9/2021 | Ichimura | |
| 2025/0168296 A1* | 5/2025 | Choi | H04N 7/083 |

FOREIGN PATENT DOCUMENTS

| | | |
|---|---|---|
| KR | 10-2021-0035723 | 4/2021 |
| KR | 10-2021-0049786 | 5/2021 |
| KR | 10-2279280 | 7/2021 |

OTHER PUBLICATIONS

European Patent Office Application Serial No. 21951975.8, Search Report dated Mar. 27, 2025, 13 pages.
Alan Kobayashi, "DisplayPort™ Ver. 1.2 Overview", DisplayPort Developer Conference, Dec. 6, 2010, 34 pages.

* cited by examiner

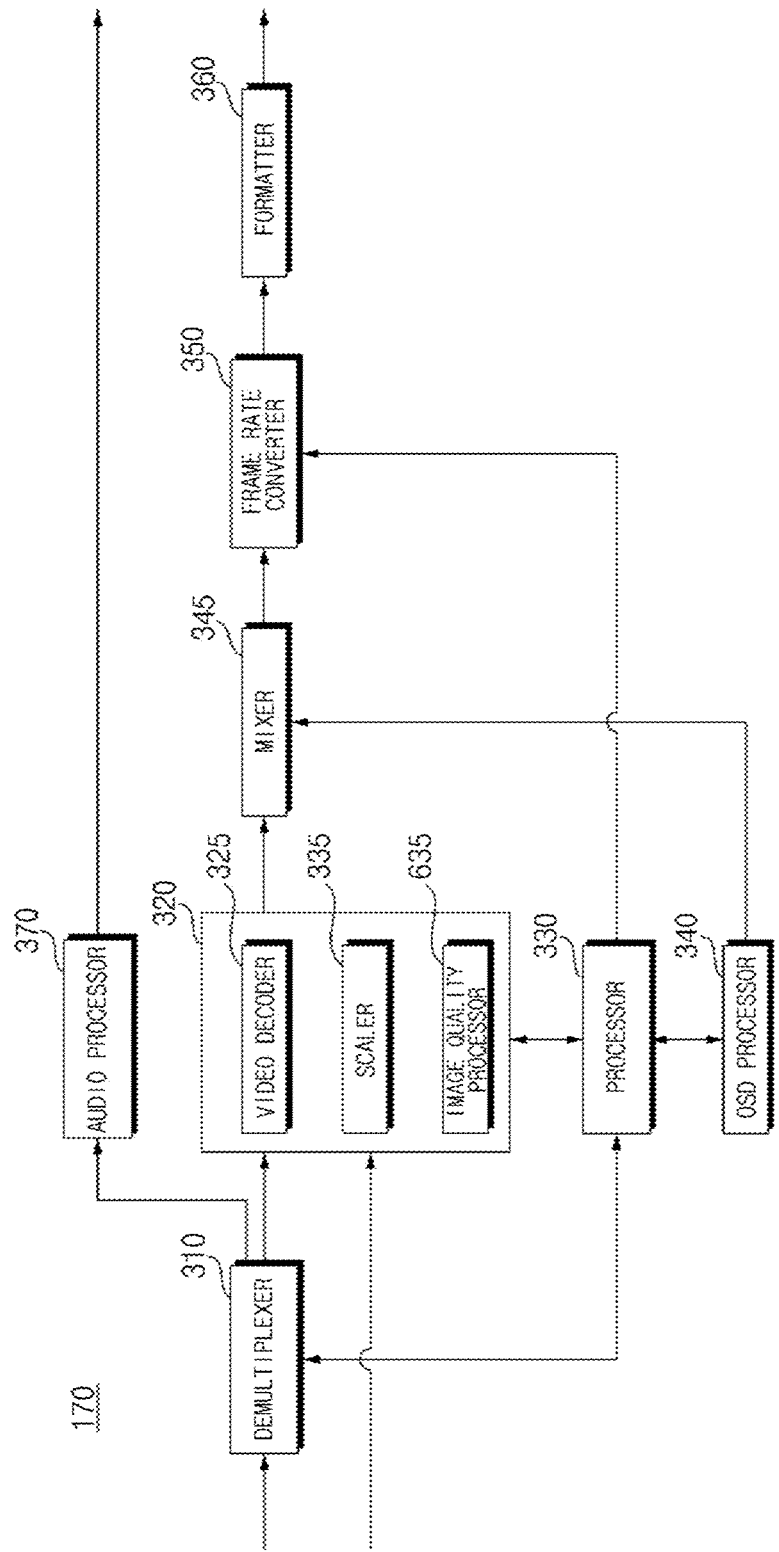

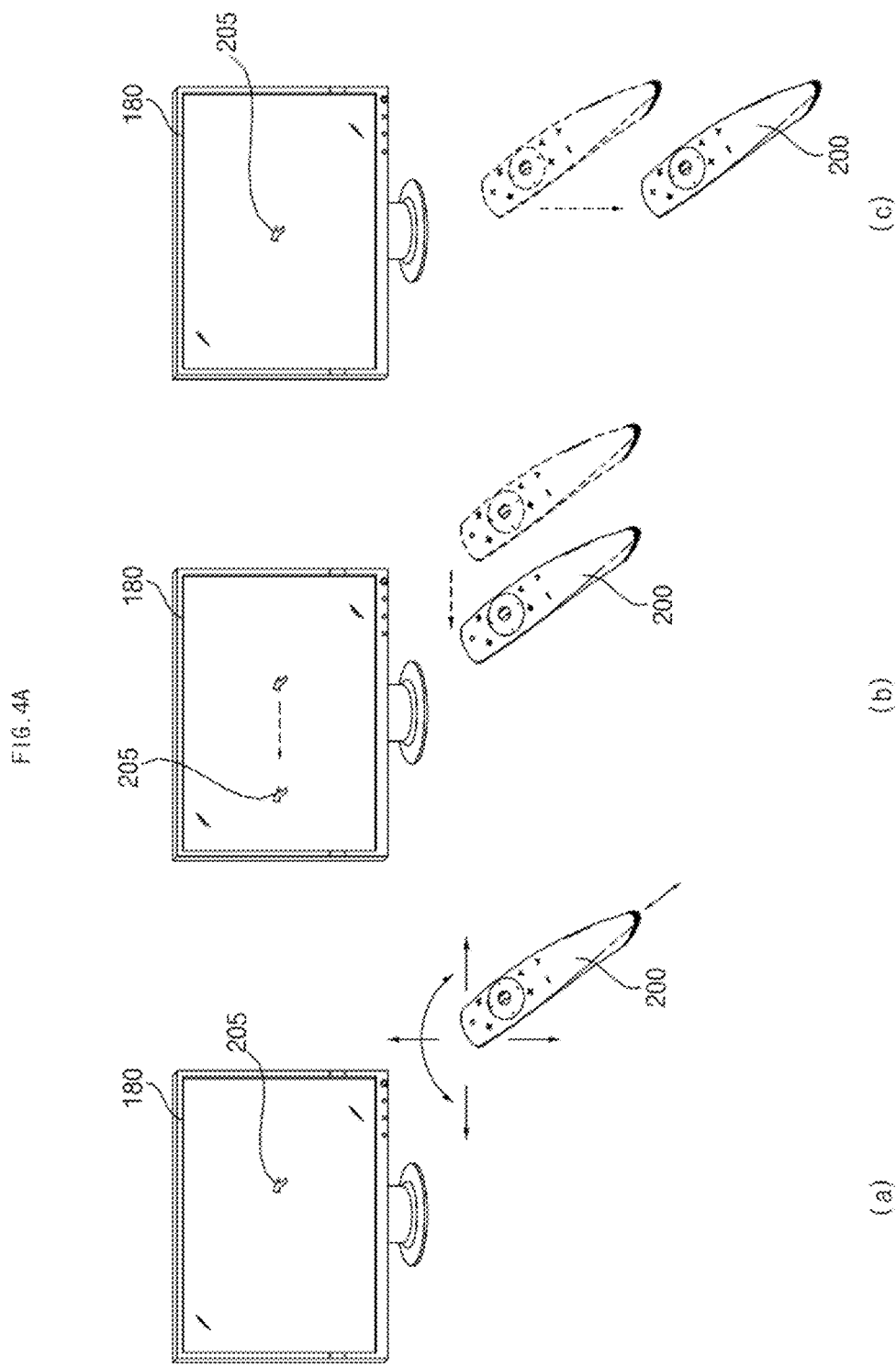

FIG. 9B

| State | OPERATION | OUTPUT | MONO PIN | MON1 PIN |
|---|---|---|---|---|
| TX0 | Power-down | Unstable | High (Pull-up) | High (Pull-up) |
| TX1 | Power-on : TX PLL Ready | Unstable | Low (RX Active) | High (Pull-up) |
| TX2 | CLK PATTERN OUT PUT | CLK TRAINING PATTERN MON1 : Low | Low (RX Active) | Low (TX Active) |
| TX3 | ALN PATTERN OUTPUT AND BACK CHANNEL CHECK | ALN TRAINING PATTERN MON1 : Low | High (Pull-up) | Low (TX Active) |
| TX4 | VIDEO OUTPUT | NORMAL VIDEO PATTERN | High (Pull-up) | High (Pull-up) |

FIG. 10B

| State | OPERATION | OUTPUT | MON0 PIN | MON1 PIN |
|---|---|---|---|---|
| RX0 | Power-down | VIDEO : Invalid | High (Pull-up) | High (Pull-up) |
| RX1 | CLK Training | VIDEO : Invalid | Low (RX Active) | Low (TX Active) |
| RX2 | ALN Training | VIDEO : Invalid | High (Pull-up) | Low (TX Active) |
| RX3 | BACK CHANNEL OUTPUT | VIDEO : Invalid Back channel : Back ALN Pattern | High (Pull-up) | Low (TX Active) |
| RX4 | VIDEO OUTPUT | VIDEO : Invalid | High (Pull-up) | High (Pull-up) |

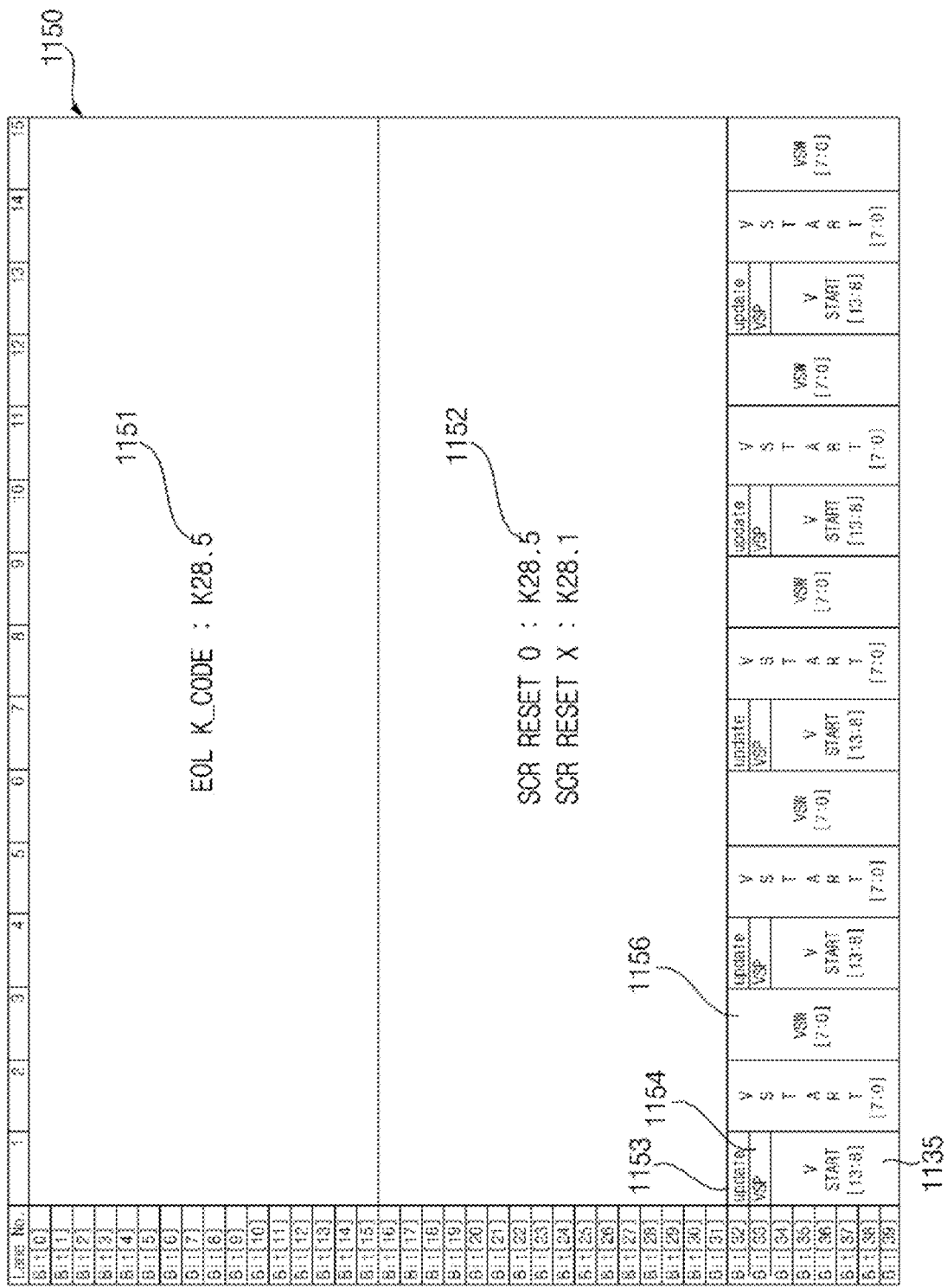

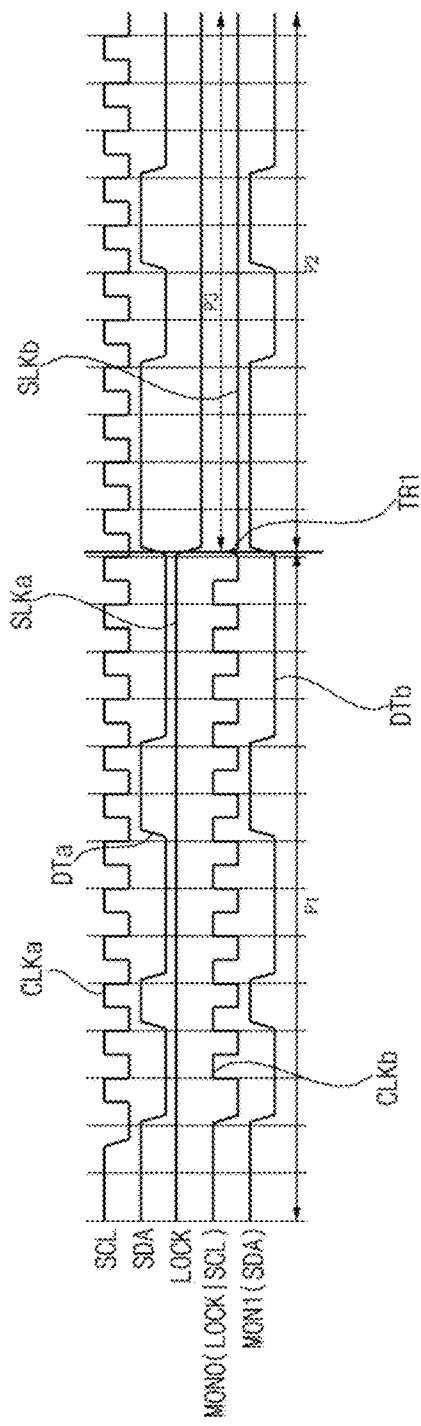

IMAGE DISPLAY DEVICE

CROSS-REFERENCE TO RELATED APPLICATION(S)

This application is the National Stage filing under 35 U.S.C. 371 of International Application No. PCT/KR2021/009797, filed on Jul. 28, 2021, the contents of which is hereby incorporated by reference herein in its entirety.

BACKGROUND

Field of the Disclosure

The present disclosure relates to an image display apparatus, and more particularly, to an image display apparatus capable of performing data transmission in the direction of a display and performing data transmission in the direction of a signal processing device, through a single cable.

Description of the Related Art

An image display apparatus is an apparatus that displays an image.

To display an image on an image display apparatus, a signal processing device is configured to output video data, and a display receives and displays the video data from the signal processing device.

Meanwhile, various interfaces are provided for transmission of video data or the like between a signal processing device and a display.

US Patent Registration No. U.S. Pat. No. 9,036,081 (hereinafter referred to as 'prior art literature') relates to a video signal transmission device, a video signal reception device, and a video signal transmission system, and discloses selecting of a pattern according to a data enable signal of video data, encoding of a video signal during an active period, and encoding of a synchronization signal during a blank period.

However, according to the prior art literature, when video data is transmitted, only forward data is transmitted and a reverse channel is not provided, which requires connecting a separate cable for reverse data transmission.

In addition, according to the prior art literature, since synchronization signals such as a vertical synchronization signal and a horizontal synchronization signal must be transmitted in real time, the bandwidth for data transmission is reduced.

SUMMARY

An object of the present disclosure is to provide an image display apparatus capable of performing data transmission in the direction of a display and data transmission in the direction of a signal processing device, through a single cable.

Another object of the present disclosure is to provide an image display apparatus capable of simplifying cable wiring since integrated support for control data and the like is possible.

Another object of the present disclosure is to provide an image display apparatus capable of transmitting high-resolution video data by not transmitting a synchronization signal in real time.

To accomplish the above and other objects, an embodiment of the present disclosure provides an image display apparatus including: a display; and a signal processing device configured to output data to the display, wherein a first interface in the signal processing device is configured to transmit the data to a second interface in the display by using a plurality of first direction communication lanes, and receive data from the second interface in the display by using at least one second direction communication lane.

Meanwhile, the data transmitted to the display by using the plurality of first direction communication lanes may include video data and audio data.

Meanwhile, the data received by the signal processing device by using the at least one second direction communication lane may include audio data converted through a microphone in the display or touch input data or body information data.

Meanwhile, the plurality of first direction communication lanes and the at least one second direction communication lane may be driven by unidirectional communication.

Meanwhile, the data transmission rate using the plurality of first direction communication lanes may be a first rate, and the data transmission rate using the at least one second direction communication lane may be a second rate lower than the first rate.

Meanwhile, the first interface in the signal processing device may include a first terminal and a second terminal, for bidirectional communication, wherein at least one of the first or second terminals shares an interface monitor signal and a system control bus signal.

Meanwhile, the plurality of first direction communication lanes, the at least one second direction communication lane, and the first and second transmission lanes respectively corresponding to the first and second terminals may be disposed in the same cable.

Meanwhile, the first interface in the signal processing device may be configured to pack N lanes of data into (N-1) lanes of data and output the packed (N-1) lanes of data.

Meanwhile, the first interface in the signal processing device may be configured to reorder N lanes of data, pack the reordered data into (N-1) lanes of data, and output the packed (N-1) lanes of data.

Meanwhile, the first interface in the signal processing device may include a first terminal and a second terminal, for bidirectional communication, and, after powered on, in a standby mode, may determine whether the signal level of the first terminal is a low level, and, if the signal level is the low level, may be controlled to enter a first training mode.

Meanwhile, the first interface in the signal processing device may be configured to periodically transmit a clock signal during the first training mode, and, when the signal level of the first terminal is changed from the low level to a high level, may be controlled to enter a second training mode.

Meanwhile, the first interface in the signal processing device may be configured to transmit a pattern signal during the second training mode, and upon receiving an acknowledgement signal after the transmission of the pattern signal, may be configured to transmit the data to the second interface in the display by using the plurality of first direction communication lanes, and transmit the system control bus signal by using the first terminal and the second terminal.

Meanwhile, the first interface in the signal processing device may be configured to output a data frame through the plurality of first direction communication lanes, wherein the data frame may include video data, audio data, line end information, additional data, and frame end information.

Meanwhile, the data frame may not include a data enable signal, a vertical synchronization signal, and a horizontal synchronization signal.

Meanwhile, the video data in the data frame may include preamble data and RGB data.

Meanwhile, when the bits of the RGB data are less than a first reference number of bits, the first interface in the signal processing device may be configured to transmit the RGB data by padding lower-order bits with zero.

Meanwhile, the audio data in the data frame may include preamble data, bit information data, and audio bit data.

Meanwhile, the line end information in the data frame may include line end data, scrambler reset data, update data, horizontal synchronization polarity information, length information, and width information of the horizontal synchronization signal.

Meanwhile, the first interface in the signal processing device may be configured to map additional data to a blank period in the data frame and transmit the additional data.

Meanwhile, the additional data in the data frame may include preamble data and data usage information.

Meanwhile, the frame end information in the data frame may include frame end data, scrambler reset data, update data, vertical synchronization polarity information, length information, and width information of the vertical synchronization signal.

Another embodiment of the present disclosure provides an image display apparatus including: a display; and a signal processing device configured to output data to the display, wherein a first interface in the signal processing device is configured to transmit the data to a second interface in the display by using a plurality of first direction communication lanes, and the first interface includes a terminal for receiving a first reverse signal and a terminal for receiving a second reverse signal.

Meanwhile, when the first interface in the signal processing device is configured to receive "1" bit, the first reverse signal may be toggled in 180 degrees out of phase with the clock, and the second reverse signal may be toggled after 180 degrees of phase difference from the clock, and, wherein when the first interface in the signal processing device is configured to receive '0' bit, the second reverse signal may be toggled in 180 degrees out of phase with the clock, and the first reverse signal may be toggled after 180 degrees of phase difference from the clock.

Meanwhile, the first interface in the signal processing device may receive data from the second interface in the display, the data being divided into an idle period in which reverse data is not received, a pre data period in which clocks and data type information are transmitted, a payload period in which the reverse data is transmitted, and a post data period in which a counter is reset.

Meanwhile, the first interface in the signal processing device may include a first terminal and a second terminal, for bidirectional communication, wherein the first terminal in the first interface may receive an I2C clock signal and an interface lock signal, and the second terminal in the first interface may receive I2C protocol data.

Meanwhile, upon receiving a clock signal by the first terminal in the first interface, the first interface may determine whether the clock signal is the I2C clock signal or not, and upon receiving a low-level signal after a trigger signal by the first terminal in the first interface, the first interface may determine whether the low-level signal after the trigger signal is the lock signal or not.

Effects of the Disclosure

In accordance with one embodiment of the present disclosure, there is provided an image display apparatus including: a display; and a signal processing device configured to output data to the display, wherein a first interface in the signal processing device is configured to transmit the data to a second interface in the display by using a plurality of first direction communication lanes, and receive data from the second interface in the display by using at least one second direction communication lane. Accordingly, it is possible to perform data transmission in the direction of the display and data transmission in the direction of the signal processing device, through a single cable.

Meanwhile, the data transmitted to the display by using the plurality of first direction communication lanes may include video data and audio data. Accordingly, it is possible to transmit audio data, as well as video data, to the display.

Meanwhile, the data received by the signal processing device by using the at least one second direction communication lane may include audio data converted through a microphone in the display or touch input data or body information data. Accordingly, it is possible to receive audio data, touch input data, or body information data from the display and process it.

Meanwhile, the plurality of first direction communication lanes and the at least one second direction communication lane may be driven by unidirectional communication. Accordingly, it is possible to perform forward data transmission and reverse data transmission, respectively.

Meanwhile, the data transmission rate using the plurality of first direction communication lanes may be a first rate, and the data transmission rate using the at least one second direction communication lane may be a second rate lower than the first rate. Accordingly, data based on low-speed data communication can be transmitted, and high-resolution based video data can be transmitted according to high-speed data communication.

Meanwhile, the first interface in the signal processing device may include a first terminal and a second terminal, for bidirectional communication, wherein at least one of the first or second terminals shares an interface monitor signal and a system control bus signal. Accordingly, since integrated support of control data and the like is possible, cable wiring can be simplified.

Meanwhile, the plurality of first direction communication lanes, the at least one second direction communication lane, and the first and second transmission lanes respectively corresponding to the first and second terminals may be disposed in the same cable. Accordingly, forward data transmission, reverse data transmission, and control data transmission are possible through one cable.

Meanwhile, the first interface in the signal processing device may be configured to pack N lanes of data into (N-1) lanes of data and output the packed (N-1) lanes of data. Accordingly, reverse data transmission is possible through the remaining lane, and data transmission can be performed efficiently.

Meanwhile, the first interface in the signal processing device may be configured to reorder N lanes of data, pack the reordered data into (N-1) lanes of data, and output the packed (N-1) lanes of data. Accordingly, reverse data transmission is possible through the remaining lane, and data transmission can be performed efficiently.

Meanwhile, the first interface in the signal processing device may include a first terminal and a second terminal, for bidirectional communication, and, after powered on, in a standby mode, may determine whether the signal level of the first terminal is a low level, and, if the signal level is the low level, may be controlled to enter a first training mode. Accordingly, it is possible to easily enter the first training mode state.

Meanwhile, the first interface in the signal processing device may be configured to periodically transmit a clock signal during the first training mode, and, when the signal level of the first terminal is changed from the low level to a high level, may be controlled to enter a second training mode. Accordingly, it is possible to easily enter the second training mode state.

Meanwhile, the first interface in the signal processing device may be configured to transmit a pattern signal during the second training mode, and upon receiving an acknowledgement signal after the transmission of the pattern signal, may be configured to transmit the data to the second interface in the display by using the plurality of first direction communication lanes, and transmit the system control bus signal by using the first terminal and the second terminal. Accordingly, it is possible to perform unidirectional data transmission and bidirectional control data transmission.

Meanwhile, the first interface in the signal processing device may be configured to output a data frame through the plurality of first direction communication lanes, wherein the data frame may include video data, audio data, line end information, additional data, and frame end information. Accordingly, it is possible to efficiently transmit the data frame.

Meanwhile, the data frame may not include a data enable signal, a vertical synchronization signal, and a horizontal synchronization signal. Accordingly, it is possible to efficiently transmit data.

Meanwhile, the video data in the data frame may include preamble data and RGB data. Accordingly, it is possible to efficiently transmit the video data.

Meanwhile, when the bits of the RGB data are less than a first reference number of bits, the first interface in the signal processing device may be configured to transmit the RGB data by padding lower-order bits with zero. Accordingly, it is possible to efficiently transmit the RGB data.

Meanwhile, the audio data in the data frame may include preamble data, bit information data, and audio bit data. Accordingly, it is possible to efficiently transmit the audio data.

Meanwhile, the line end information in the data frame may include line end data, scrambler reset data, update data, horizontal synchronization polarity information, length information, and width information of the horizontal synchronization signal. Accordingly, it is possible to efficiently transmit the line end information.

Meanwhile, the first interface in the signal processing device may be configured to map additional data to a blank period in the data frame and transmit the additional data. Accordingly, it is possible to efficiently transmit the additional data.

Meanwhile, the additional data in the data frame may include preamble data and data usage information. Accordingly, it is possible to efficiently transmit the additional data.

Meanwhile, the frame end information in the data frame may include frame end data, scrambler reset data, update data, vertical synchronization polarity information, length information, and width information of the vertical synchronization signal. Accordingly, it is possible to efficiently transmit the frame end information.

In accordance with another embodiment of the present disclosure, there is provided an image display apparatus including: a display; and a signal processing device configured to output data to the display, wherein a first interface in the signal processing device is configured to transmit the data to a second interface in the display by using a plurality of first direction communication lanes, and the first interface includes a terminal for receiving a first reverse signal and a terminal for receiving a second reverse signal. Accordingly, it is possible to perform data transmission in the direction of the display and data transmission in the direction of the signal processing device, through a single cable.

Meanwhile, when the first interface in the signal processing device is configured to receive "1" bit, the first reverse signal may be toggled in 180 degrees out of phase with the clock, and the second reverse signal may be toggled after 180 degrees of phase difference from the clock, and, wherein when the first interface in the signal processing device is configured to receive '0' bit, the second reverse signal may be toggled in 180 degrees out of phase with the clock, and the first reverse signal may be toggled after 180 degrees of phase difference from the clock. Accordingly, it is possible to receive a reverse signal.

Meanwhile, the first interface in the signal processing device may receive data from the second interface in the display, the data being divided into an idle period in which reverse data is not received, a pre data period in which clocks and data type information are transmitted, a payload period in which the reverse data is transmitted, and a post data period in which a counter is reset. Accordingly, it is possible to receive a reverse signal.

Meanwhile, the first interface in the signal processing device may include a first terminal and a second terminal, for bidirectional communication, wherein the first terminal in the first interface may receive an I2C clock signal and an interface lock signal, and the second terminal in the first interface may receive I2C protocol data. Accordingly, control data can be transmitted or received through bidirectional communication.

Meanwhile, upon receiving a clock signal by the first terminal in the first interface, the first interface may determine whether the clock signal is the I2C clock signal or not, and upon receiving a low-level signal after a trigger signal by the first terminal in the first interface, the first interface may determine whether the low-level signal after the trigger signal is the lock signal or not. Accordingly, the clock signal and the lock signal can be received separately through the first terminal.

BRIEF DESCRIPTION OF THE DRAWINGS

FIG. 3 is an example of an internal block diagram of a signal processing device of FIG. 2;

FIG. 4A is a diagram showing a control method of a remote controller of FIG. 2;

FIGS. 13 to 15 are diagrams referenced in the description of FIG. 12.

DETAILED DESCRIPTION OF THE PREFERRED EMBODIMENTS

Hereinafter, the present disclosure will be described in detail with reference to the accompanying drawings.

With respect to constituent elements used in the following description, suffixes "module" and "unit" are given only in consideration of ease in preparation of the specification, and do not have or serve different meanings. Accordingly, the suffixes "module" and "unit" may be used interchangeably.

Figure 1:
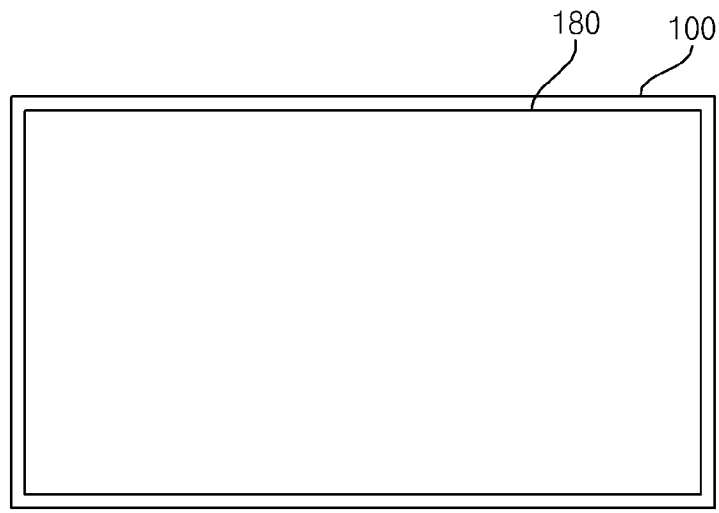
FIG. 1 is a diagram showing an image display apparatus according to an embodiment of the present disclosure.

FIG. 1 is a diagram showing an image display apparatus according to an embodiment of the present disclosure.

Referring to the figure, the image display apparatus 100 may include a display 180.

Meanwhile, the display 180 may be implemented with any one of various panels. For example, the display 180 may be any one of a liquid crystal display panel (LCD panel), an organic light emitting diode panel (OLED panel), and an inorganic light emitting diode panel (LED panel).

The liquid crystal display panel may further require a separate backlight in addition to a panel configured to display an image.

Meanwhile, an organic light emitting panel or an inorganic light emitting panel does not require a separate backlight for image display.

Meanwhile, the display resolution of the display 180 tends to increase to 2K, 4K, 8K, 16K, and the like.

Accordingly, the amount of data transmitted between the signal processing device (170 in FIG. 2) and the display 180 in the image display apparatus 100 increases.

In particular, as the resolution of video data transmitted from the signal processing device 170 to the display 180 increases, the amount of video data increases. Accordingly, an interface capable of transmitting high-speed video data from the signal processing device 170 to the display 180 is required.

Meanwhile, a microphone or touch sensor can be mounted on the display 180, and it is necessary to transmit audio data, touch input data, or body information data by the microphone or touch sensor to the signal processing device 170.

Accordingly, an embodiment of the present disclosure proposes a method in which a single cable (CAB in FIG. 7) is used between the signal processing device 170 and the display 180 to perform high-speed data transmission from the signal processing device 170 to the display 180 and transmit various data from the display 180 to the signal processing device 170.

To this end, the image display apparatus 100 according to an embodiment of the present disclosure includes a display 180 and a signal processing device 170 that outputs data to the display 180, and a first interface (171 in FIG. 7) in the signal processing device 170 transmits data to a second interface (181 in FIG. 7) in the display 180 by using a plurality of first direction communication lanes Lane 1 to Lane (N-1) and receives data from the second interface 181 in the display 180 by using at least one second direction communication lane Lane N. Accordingly, it is possible to perform data transmission in the direction of the display 180 and data transmission in the direction of the signal processing device 170, through a single cable.

Meanwhile, the image display apparatus 100 of FIG. 1 may be a TV, a monitor, a tablet PC, a laptop computer, a mobile terminal, a vehicle display device, a commercial display device, a signage, and the like.

Figure 2:
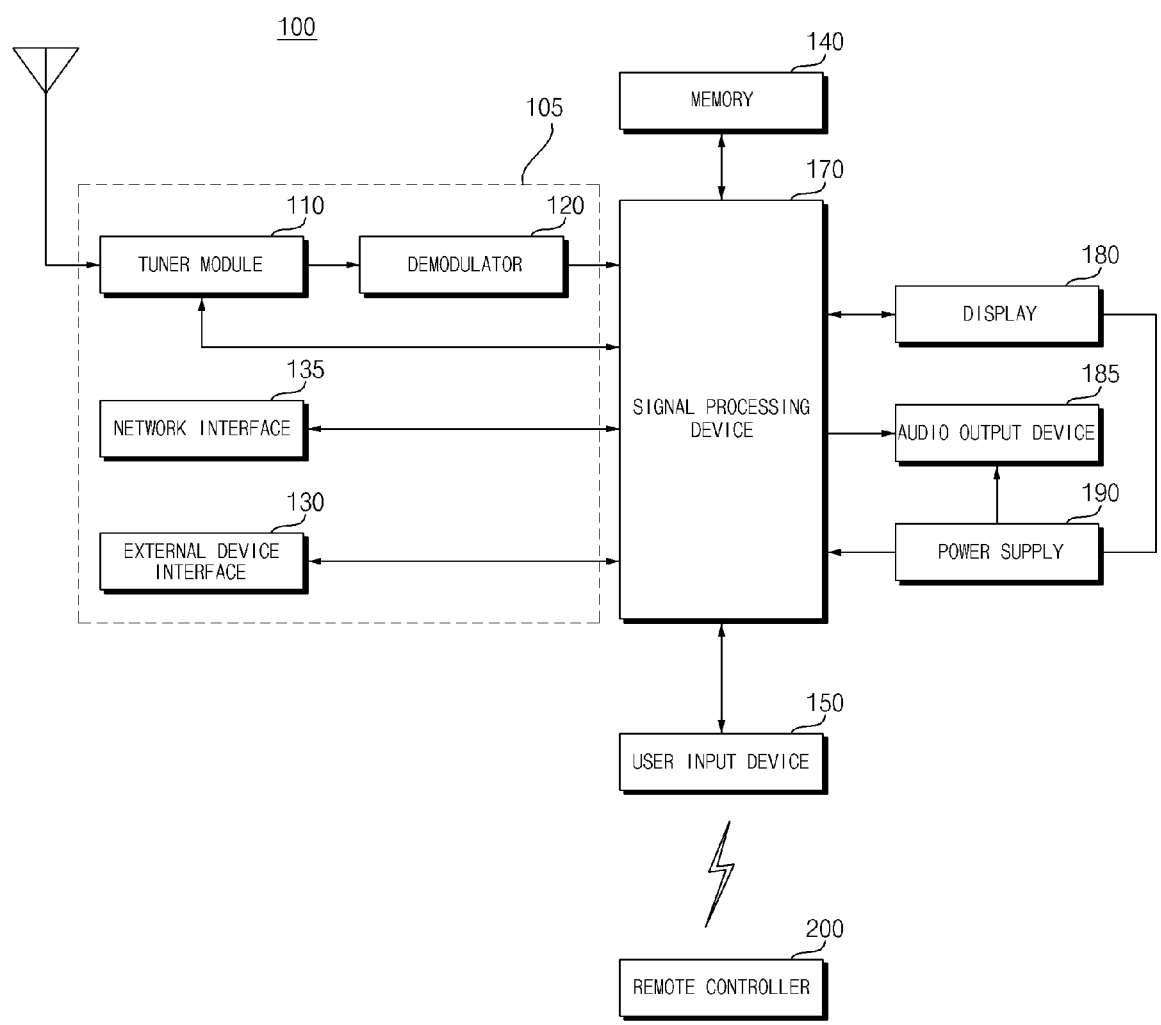
FIG. 2 is an example of an internal block diagram of the image display apparatus of FIG. 1.

FIG. 2 is an example of an internal block diagram of the image display apparatus of FIG. 1.

Referring to FIG. 2, an image display apparatus 100 according to an embodiment of the present disclosure includes an image receiver 105, an external device interface 130, a memory 140, a user input device 150, a sensor device (not shown), a signal processing device 170, a display 180, and an audio output device 185.

The image receiver 105 may include a tuner module 110, a demodulator 120, a network interface 135, and an external device interface 130.

Meanwhile, unlike the drawing, the image receiver 105 may include only the tuner module 110, the demodulator 120, and the external device interface 130. That is, the network interface 135 may not be included.

The tuner module 110 selects an RF broadcast signal corresponding to a channel selected by a user or all pre-stored channels among radio frequency (RF) broadcast signals received through an antenna (not shown). In addition, the selected RF broadcast signal is converted into an intermediate frequency signal, a baseband image, or an audio signal.

For example, if the selected RF broadcast signal is a digital broadcast signal, it is converted into a digital IF signal (DIF). If the selected RF broadcast signal is an analog broadcast signal, it is converted into an analog baseband image or audio signal (CVBS/SIF). That is, the tuner module 110 can process a digital broadcast signal or an analog broadcast signal. The analog baseband image or audio signal (CVBS/SIF) output from the tuner module 110 may be directly input to the signal processing device 170.

Meanwhile, the tuner module 110 can include a plurality of tuners for receiving broadcast signals of a plurality of channels. Alternatively, a single tuner that simultaneously receives broadcast signals of a plurality of channels is also available.

The demodulator 120 receives the converted digital IF signal DIF from the tuner module 110 and performs a demodulation operation.

The demodulator 120 may perform demodulation and channel decoding and then output a stream signal TS. At this time, the stream signal may be a multiplexed signal of an image signal, an audio signal, or a data signal.

The stream signal output from the demodulator 120 may be input to the signal processing device 170. The signal processing device 170 performs demultiplexing, image/audio signal processing, and the like, and then outputs an image to the display 180 and outputs audio to the audio output device 185.

The external device interface 130 may be configured to transmit or receive data with a connected external device (not shown), e.g., a set-top box 50. To this end, the external device interface 130 may include an A/V input and output device (not shown).

The external device interface 130 may be connected in wired or wirelessly to an external device such as a digital versatile disk (DVD), a Blu ray, a game equipment, a camera, a camcorder, a computer(note book), and a set-top box, and may perform an input/output operation with an external device.

The A/V input and output device may receive image and audio signals from an external device. Meanwhile, a wireless communicator (not shown) may perform short-range wireless communication with other electronic apparatus.

Through the wireless communicator (not shown), the external device interface 130 may exchange data with an adjacent mobile terminal 600. In particular, in a mirroring mode, the external device interface 130 may receive device information, executed application information, application image, and the like from the mobile terminal 600.

The network interface 135 provides an interface for connecting the image display apparatus 100 to a wired/wireless network including the Internet network. For example, the network interface 135 may receive, via the network, content or data provided by the Internet, a content provider, or a network operator.

Meanwhile, the network interface 135 may include a wireless communicator (not shown).

The memory 140 may store a program for each signal processing and control in the signal processing device 170, and may store signal-processed image, audio, or data signal.

In addition, the memory 140 may serve to temporarily store image, audio, or data signal input to the external device interface 130. In addition, the memory 140 may store information on a certain broadcast channel through a channel memory function such as a channel map.

Although FIG. 2 illustrates that the memory is provided separately from the signal processing device 170, the scope of the present disclosure is not limited thereto. The memory 140 may be included in the signal processing device 170.

The user input device 150 transmits a signal input by the user to the signal processing device 170 or transmits a signal from the signal processing device 170 to the user.

For example, it may be configured to transmit/receive a user input signal such as power on/off, channel selection, screen setting, etc., from a remote controller 200, may transfer a user input signal input from a local key (not shown) such as a power key, a channel key, a volume key, a set value, etc., to the signal processing device 170, may transfer a user input signal input from a sensor device (not shown) that senses a user's gesture to the signal processing device 170, or may be configured to transmit a signal from the signal processing device 170 to the sensor device (not shown).

The signal processing device 170 may demultiplex the input stream through the tuner module 110, the demodulator 120, the network interface 135, or the external device interface 130, or process the demultiplexed signals to generate and output a signal for image or audio output.

For example, the signal processing device 170 receives a broadcast signal received by the image receiver 105 or an HDMI signal, and performs signal processing based on the received broadcast signal or the HDMI signal to thereby output a processed image signal.

The image signal processed by the signal processing device 170 is input to the display 180, and may be displayed as an image corresponding to the image signal. In addition, the image signal processed by the signal processing device 170 may be input to the external output apparatus through the external device interface 130.

The audio signal processed by the signal processing device 170 may be output to the audio output device 185 as an audio signal. In addition, audio signal processed by the signal processing device 170 may be input to the external output apparatus through the external device interface 130.

Although not shown in FIG. 2, the signal processing device 170 may include a demultiplexer, a video processor, and the like. That is, the signal processing device 170 may perform a variety of signal processing and thus it may be implemented in the form of a system on chip (SOC). This will be described later with reference to FIG. 3.

In addition, the signal processing device 170 can control the overall operation of the image display apparatus 100. For example, the signal processing device 170 may control the tuner module 110 to control the tuning of the RF broadcast corresponding to the channel selected by the user or the previously stored channel.

In addition, the signal processing device 170 may control the image display apparatus 100 according to a user command input through the user input device 150 or an internal program.

Meanwhile, the signal processing device 170 may control the display 180 to display an image. At this time, the image displayed on the display 180 may be a still image or a moving image, and may be a 2D image or a 3D image.

Meanwhile, the signal processing device 170 may display a certain object in an image displayed on the display 180. For example, the object may be at least one of a connected web screen (newspaper, magazine, etc.), an electronic program guide (EPG), various menus, a widget, an icon, a still image, a moving image, and a text.

Meanwhile, the signal processing device 170 may recognize the position of the user based on the image photographed by a photographing device (not shown). For example, the distance (z-axis coordinate) between a user and the image display apparatus 100 can be determined. In addition, the x-axis coordinate and the y-axis coordinate in the display 180 corresponding to a user position can be determined.

The display 180 generates a driving signal by converting an image signal, a data signal, an OSD signal, a control signal processed by the signal processing device 170, an image signal, a data signal, a control signal, and the like received from the external device interface 130.

Meanwhile, the display 180 may be configured as a touch screen and used as an input device in addition to an output device.

The audio output device 185 receives a signal processed by the signal processing device 170 and outputs it as an audio.

The photographing device (not shown) photographs a user. The photographing device (not shown) may be implemented by a single camera, but the present disclosure is not limited thereto and may be implemented by a plurality of cameras. Image information photographed by the photographing device (not shown) may be input to the signal processing device 170.

The signal processing device 170 may sense a gesture of the user based on each of the images photographed by the photographing device (not shown), the signals detected from the sensor device (not shown), or a combination thereof.

The power supply 190 supplies corresponding power to the image display apparatus 100. Particularly, the power may be supplied to a controller 170 which can be implemented in the form of a system on chip (SOC), a display 180 for displaying an image, and an audio output device 185 for outputting an audio.

Specifically, the power supply 190 may include an AC/DC converter to convert AC voltage into DC voltage and a DC/DC converter to convert the level of the DC voltage.

The remote controller 200 transmits the user input to the user input device 150. To this end, the remote controller 200 may use Bluetooth, a radio frequency (RF) communication, an infrared (IR) communication, an Ultra Wideband (UWB), ZigBee, or the like. In addition, the remote controller 200 may receive the image, audio, or data signal output from the user input device 150, and display it on the remote controller 200 or output it as an audio.

Meanwhile, the image display apparatus 100 may be a fixed or mobile digital broadcasting receiver capable of receiving digital broadcasting.

Meanwhile, a block diagram of the image display apparatus 100 shown in FIG. 2 is a block diagram for an embodiment of the present disclosure. Each component of the block diagram may be integrated, added, or omitted according to a specification of the image display apparatus 100 actually implemented. That is, two or more components may be combined into a single component as needed, or a single component may be divided into two or more components. The function performed in each block is described for the purpose of illustrating embodiments of the present disclosure, and specific operation and apparatus do not limit the scope of the present disclosure.

FIG. 3 is an example of an internal block diagram of the signal processing device of FIG. 2.

Referring to the figure, a signal processing device 170 according to an embodiment of the present disclosure may include a demultiplexer 310, a video processor 320, a processor 330, and an audio processor 370. In addition, the signal processing device 170 may further include and a data processor (not shown).

The demultiplexer 310 demultiplexes the input stream. For example, when an MPEG-2 TS is input, it can be demultiplexed into image, audio, and data signal, respectively. Here, the stream signal input to the demultiplexer 310 may be a stream signal output from the tuner module 110, the demodulator 120, or the external device interface 130.

The video processor 320 may perform signal processing on an input image. For example, the video processor 320 may perform image processing on an image signal demultiplexed by the demultiplexer 310.

To this end, the video processor 320 may include a video decoder 325, a scaler 335, an image quality processor 635, a video encoder (not shown), an OSD processor 340, a frame rate converter 350, a formatter 360, etc.

The video decoder 325 decodes a demultiplexed image signal, and the scaler 335 performs scaling so that the resolution of the decoded image signal can be output from the display 180.

The video decoder 325 can include a decoder of various standards. For example, a 3D video decoder for MPEG-2, H.264 decoder, a color image, and a depth image, and a decoder for a multiple view image may be provided.

The scaler 335 may scale an input image signal decoded by the video decoder 325 or the like.

For example, if the size or resolution of an input image signal is small, the scaler 335 may upscale the input image signal, and, if the size or resolution of the input image signal is great, the scaler 335 may downscale the input image signal.

The image quality processor 635 may perform image quality processing on an input image signal decoded by the video decoder 325 or the like.

For example, the image quality processor 625 may perform noise reduction processing on an input image signal, extend a resolution of high gray level of the input image signal, perform image resolution enhancement, perform high dynamic range (HDR)-based signal processing, change a frame rate, perform image quality processing suitable for properties of a panel, especially an OLED panel, etc.

The OSD processor 340 generates an OSD signal according to a user input or by itself. For example, based on a user input signal, the OSD processor 340 may generate a signal for displaying various information as a graphic or a text on the screen of the display 180. The generated OSD signal may include various data such as a user interface screen of the image display apparatus 100, various menu screens, a widget, and an icon. In addition, the generated OSD signal may include a 2D object or a 3D object.

In addition, the OSD processor 340 may generate a pointer that can be displayed on the display, based on a pointing signal input from the remote controller 200. In particular, such a pointer may be generated by a pointing signal processing device, and the OSD processor 340 may include such a pointing signal processing device (not shown). Obviously, the pointing signal processing device (not shown) may be provided separately from the OSD processor 340.

The frame rate converter (FRC) 350 may convert the frame rate of an input image. Meanwhile, the frame rate converter 350 can also directly output the frame rate without any additional frame rate conversion.

Meanwhile, the formatter 360 may change a format of an input image signal into a format suitable for displaying the image signal on a display and output the image signal in the changed format.

In particular, the formatter 360 may change a format of an image signal to correspond to a display panel.

Meanwhile, the formatter 360 may change the format of the image signal. For example, it may change the format of the 3D image signal into any one of various 3D formats such as a side by side format, a top/down format, a frame sequential format, an interlaced format, a checker box format, and the like.

The processor 330 may control overall operations of the image display apparatus 100 or the signal processing device 170.

For example, the processor 330 may control the tuner module 110 to control the tuning of an RF broadcast corresponding to a channel selected by a user or a previously stored channel.

In addition, the processor 330 may control the image display apparatus 100 according to a user command input through the user input device 150 or an internal program.

In addition, the processor 330 may be configured to transmit data to the network interface 135 or to the external device interface 130.

In addition, the processor 330 may control the demultiplexer 310, the video processor 320, and the like in the signal processing device 170.

Meanwhile, the audio processor 370 in the signal processing device 170 may perform the audio processing of the demultiplexed audio signal. To this end, the audio processor 370 may include various decoders.

In addition, the audio processor 370 in the signal processing device 170 may process a base, a treble, a volume control, and the like.

The data processor (not shown) in the signal processing device 170 may perform data processing of the demultiplexed data signal. For example, when the demultiplexed data signal is a coded data signal, it can be decoded. The encoded data signal may be electronic program guide information including broadcast information such as a start time and an end time of a broadcast program broadcasted on each channel.

Meanwhile, a block diagram of the signal processing device 170 shown in FIG. 3 is a block diagram for an embodiment of the present disclosure. Each component of the block diagram may be integrated, added, or omitted according to a specification of the signal processing device 170 actually implemented.

In particular, the frame rate converter 350 and the formatter 360 may be provided separately in addition to the video processor 320.

FIG. 4A is a diagram illustrating a control method of the remote controller of FIG. 2.

As shown in FIG. 4A(a), it is illustrated that a pointer 205 corresponding to the remote controller 200 is displayed on the display 180.

The user may move or rotate the remote controller 200 up and down, left and right (FIG. 4A(b)), and back and forth (FIG. 4A(c)). The pointer 205 displayed on the display 180 of the image display apparatus corresponds to the motion of the remote controller 200. Such a remote controller 200 may be referred to as a space remote controller or a 3D pointing apparatus, because the pointer 205 is moved and displayed according to the movement in a 3D space, as shown in the drawing.

FIG. 4A(b) illustrates that when the user moves the remote controller 200 to the left, the pointer 205 displayed on the display 180 of the image display apparatus also moves to the left correspondingly.

Information on the motion of the remote controller 200 detected through a sensor of the remote controller 200 is transmitted to the image display apparatus. The image display apparatus may calculate the coordinate of the pointer 205 from the information on the motion of the remote controller 200. The image display apparatus may display the pointer 205 to correspond to the calculated coordinate.

FIG. 4A(c) illustrates a case where the user moves the remote controller 200 away from the display 180 while pressing a specific button of the remote controller 200. Thus, a selection area within the display 180 corresponding to the pointer 205 may be zoomed in so that it can be displayed to be enlarged. On the other hand, when the user moves the remote controller 200 close to the display 180, the selection area within the display 180 corresponding to the pointer 205 may be zoomed out so that it can be displayed to be decreased. Meanwhile, when the remote controller 200 moves away from the display 180, the selection area may be zoomed out, and when the remote controller 200 approaches the display 180, the selection area may be zoomed in.

Meanwhile, when the specific button of the remote controller 200 is pressed, it is possible to exclude the recognition of vertical and lateral movement. That is, when the remote controller 200 moves away from or approaches the display 180, the up, down, left, and right movements are not recognized, and only the forward and backward movements are recognized. Only the pointer 205 is moved according to the up, down, left, and right movements of the remote controller 200 in a state where the specific button of the remote controller 200 is not pressed.

Meanwhile, the moving speed or the moving direction of the pointer 205 may correspond to the moving speed or the moving direction of the remote controller 200.

Figure 4B:
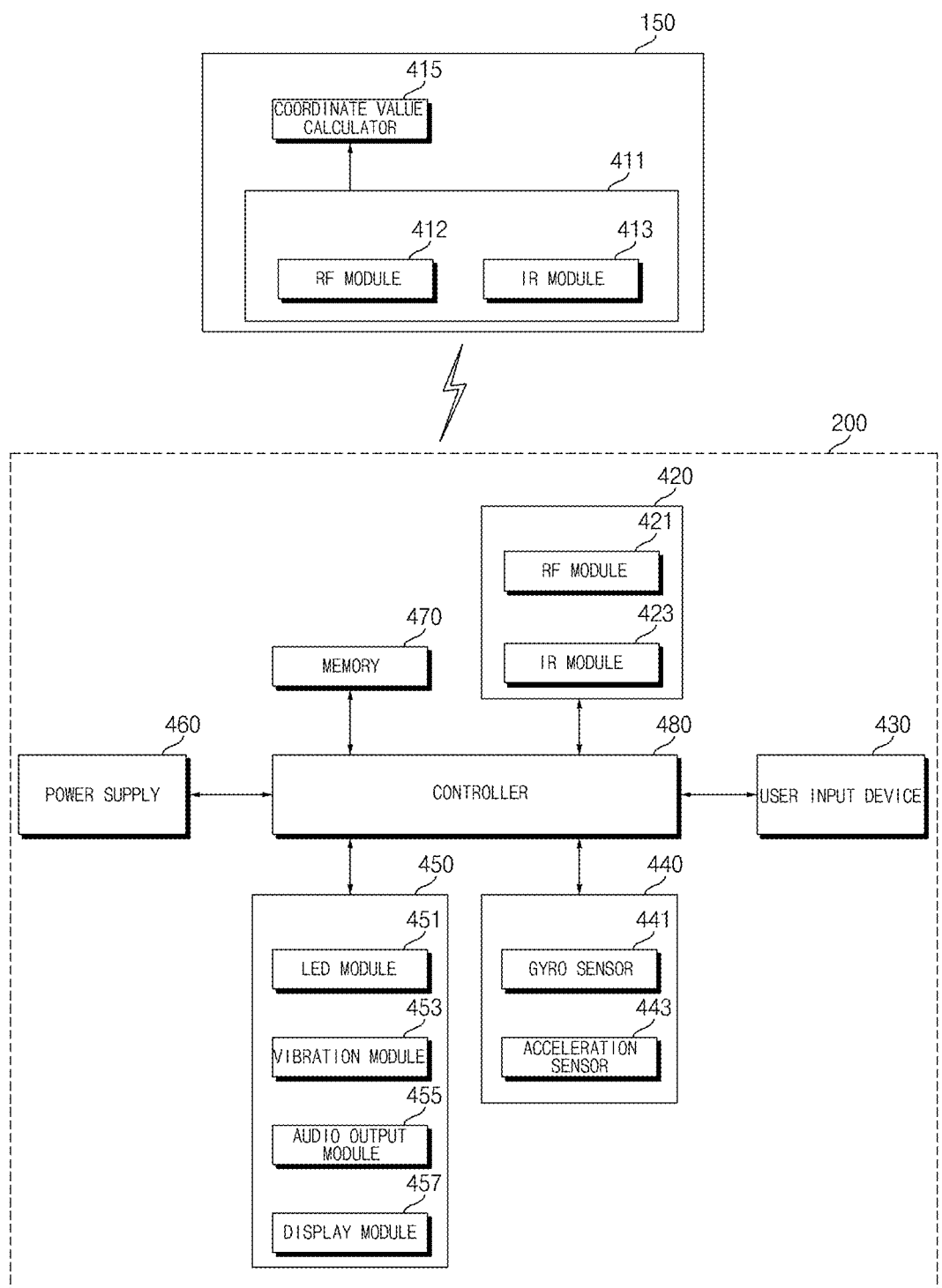
FIG. 4B is an internal block diagram of the remote controller of FIG. 2.

FIG. 4B is an internal block diagram of the remote controller of FIG. 2.

Referring to the figure, the remote controller 200 includes a wireless communicator 425, a user input device 435, a sensor device 440, an output device 450, a power supply 460, a memory 470, and a controller 480.

The wireless communicator 425 transmits/receives a signal to/from any one of the image display apparatuses according to the embodiments of the present disclosure described above. Among the image display apparatuses according to the embodiments of the present disclosure, one image display apparatus 100 will be described as an example.

In the present embodiment, the remote controller 200 may include an RF module 421 for transmitting and receiving signals to and from the image display apparatus 100 according to a RF communication standard. In addition, the remote controller 200 may include an IR module 423 for transmitting and receiving signals to and from the image display apparatus 100 according to a IR communication standard.

In the present embodiment, the remote controller 200 transmits a signal containing information on the motion of the remote controller 200 to the image display apparatus 100 through the RF module 421.

In addition, the remote controller 200 may receive the signal transmitted by the image display apparatus 100 through the RF module 421. In addition, if necessary, the remote controller 200 may be configured to transmit a command related to power on/off, channel change, volume change, and the like to the image display apparatus 100 through the IR module 423.

The user input device 435 may be implemented by a keypad, a button, a touch pad, a touch screen, or the like. The user may operate the user input device 435 to input a command related to the image display apparatus 100 to the remote controller 200. When the user input device 435 includes a hard key button, the user can input a command related to the image display apparatus 100 to the remote controller 200 through a push operation of the hard key button. When the user input device 435 includes a touch screen, the user may touch a soft key of the touch screen to input the command related to the image display apparatus 100 to the remote controller 200. In addition, the user input device 435 may include various types of input means such as a scroll key, a jog key, etc., which can be operated by the user, and the present disclosure does not limit the scope of the present disclosure.

The sensor device 440 may include a gyro sensor 441 or an acceleration sensor 443. The gyro sensor 441 may sense information about the motion of the remote controller 200.

For example, the gyro sensor 441 may sense information on the operation of the remote controller 200 based on the x, y, and z axes. The acceleration sensor 443 may sense information on the moving speed of the remote controller 200. Meanwhile, a distance measuring sensor may be further provided, and thus, the distance to the display 180 may be sensed.

The output device 450 may be configured to output an image or an audio signal corresponding to the operation of the user input device 435 or a signal transmitted from the image display apparatus 100. Through the output device 450, the user may recognize whether the user input device 435 is operated or whether the image display apparatus 100 is controlled.

For example, the output device 450 may include an LED module 451 that is turned on when the user input device 435 is operated or a signal is transmitted/received to/from the image display apparatus 100 through the wireless communicator 425, a vibration module 453 for generating a vibration, an audio output module 455 for outputting an audio, or a display module 457 for outputting an image.

The power supply 460 supplies power to the remote controller 200. When the remote controller 200 is not moved for a certain time, the power supply 460 may stop the supply of power to reduce a power waste. The power supply 460 may resume power supply when a certain key provided in the remote controller 200 is operated.

The memory 470 may store various types of programs, application data, and the like necessary for the control or operation of the remote controller 200. If the remote controller 200 wirelessly transmits and receives a signal to/from the image display apparatus 100 through the RF module 421, the remote controller 200 and the image display apparatus 100 transmit and receive a signal through a certain frequency band. The controller 480 of the remote controller 200 may store information about a frequency band or the like for wirelessly transmitting and receiving a signal to/from the image display apparatus 100 paired with the remote controller 200 in the memory 470 and may refer to the stored information.

The controller 480 controls various matters related to the control of the remote controller 200. The controller 480 may be configured to transmit a signal corresponding to a certain key operation of the user input device 435 or a signal corresponding to the motion of the remote controller 200 sensed by the sensor device 440 to the image display apparatus 100 through the wireless communicator 425.

The user input device 150 of the image display apparatus 100 includes a wireless communicator 151 that can wirelessly transmit and receive a signal to and from the remote controller 200 and a coordinate value calculator 415 that can calculate the coordinate value of a pointer corresponding to the operation of the remote controller 200.

The user input device 150 may wirelessly transmit and receive a signal to and from the remote controller 200 through the RF module 412. In addition, the user input device 150 may receive a signal transmitted by the remote controller 200 through the IR module 413 according to a IR communication standard.

The coordinate value calculator 415 may correct a hand shake or an error from a signal corresponding to the operation of the remote controller 200 received through the wireless communicator 151 and calculate the coordinate value (x, y) of the pointer 205 to be displayed on the display 180.

The transmission signal of the remote controller 200 inputted to the image display apparatus 100 through the user input device 150 is transmitted to the controller 180 of the image display apparatus 100. The controller 180 may determine the information on the operation of the remote controller 200 and the key operation from the signal transmitted from the remote controller 200, and, correspondingly, control the image display apparatus 100.

For another example, the remote controller 200 may calculate the pointer coordinate value corresponding to the operation and output it to the user input device 150 of the image display apparatus 100. In this case, the user input device 150 of the image display apparatus 100 may be configured to transmit information on the received pointer coordinate value to the controller 180 without a separate correction process of hand shake or error.

For another example, unlike the drawing, the coordinate value calculator 415 may be provided in the signal processing device 170, not in the user input device 150.

Figure 5:
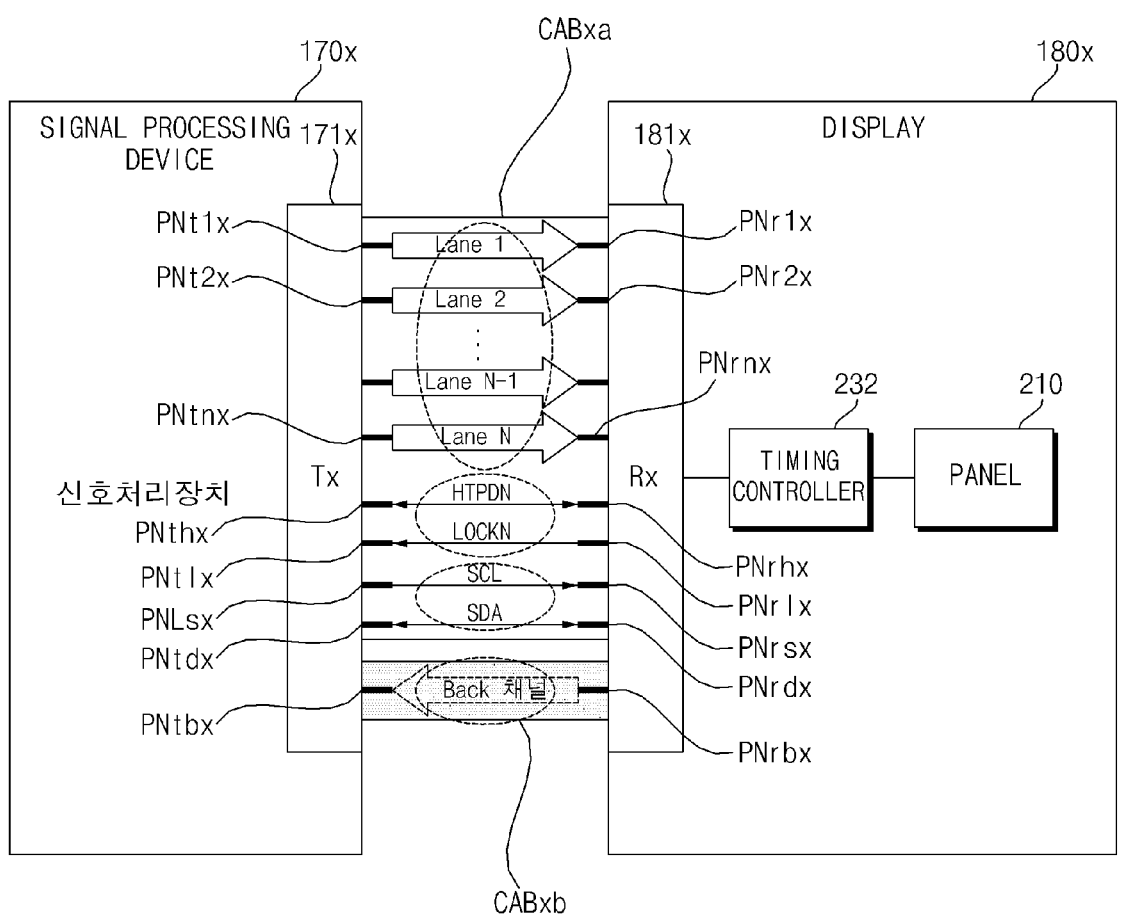
FIG. 5 is a diagram showing an interface between a signal processing device and a display, related to the present disclosure.

FIG. 5 is a diagram illustrating an interface between a signal processing device and a display, related to the present disclosure.

Referring to the drawing, a conventional image display apparatus 100x may include a first cable CABxa and a second cable CABxb, for data transmission between a signal processing device 170x and a display 180x.

The first cable CABxa includes N lanes Lane 1 to Lane N, interface control signal lines HTPDN and LOCKN, and system control bus lines SCL and SDA to transmit video data from the signal processing device 170x to the display 180x.

Meanwhile, in a case where a microphone or touch sensor is mounted on the display 180x, as described in FIG. 1, a second cable CABxb including a separate back channel line is required in order to transmit audio data or touch input data or body information data by a microphone or a touch sensor to the signal processing device 170.

Accordingly, the conventional signal processing device 170x may include terminals PNt1x to PNtnx corresponding to the N lanes Lane 1 to Lane N, terminals PNthx and PNtlx corresponding to the interface control signal lines HTPDN and LOCKN, terminals PNLsx and PNtdx corresponding to the system control bus lines SCL and SDA, and a terminal PNtbx corresponding to the back channel line.

Similarly, the conventional display 180x may include terminals PNrlx to PNrnx corresponding to the N lanes Lane 1 to Lane N, terminals PNrhx and PNrlx corresponding to the interface control signal lines HTPDN and LOCKN, terminals PNrsx and PNrdx corresponding to the system control bus lines SCL and SDA, and a terminal PNrbx corresponding to the back channel line.

As such, since a second cable CABxb including a separate back channel line is required to transmit audio data, touch input data, or body information data to the signal processing device 170, interface efficiency decreases.

Moreover, in a case where a speaker is attached to the display 180x, there is the disadvantage of having to transmit audio data through a separate cable.

In addition, since the number of terminals in the signal processing device 170x and the display 180x increases due to an additional cable, etc. there may be losses in signal transmission efficiency, power consumption, etc.

Another disadvantage is that the transmission of video data with increasing resolution cannot be performed efficiently.

Accordingly, an embodiment of the present disclosure proposes a method in which high-speed transmission from the signal processing device 170 to the display 180 is performed by using one cable (CAB in FIG. 7) between the signal processing device 170 and the display 180, and various data is transmitted from the display 180 to the signal processing device 170. This will be described with reference to FIG. 6 and the figures that follow.

Figure 6:
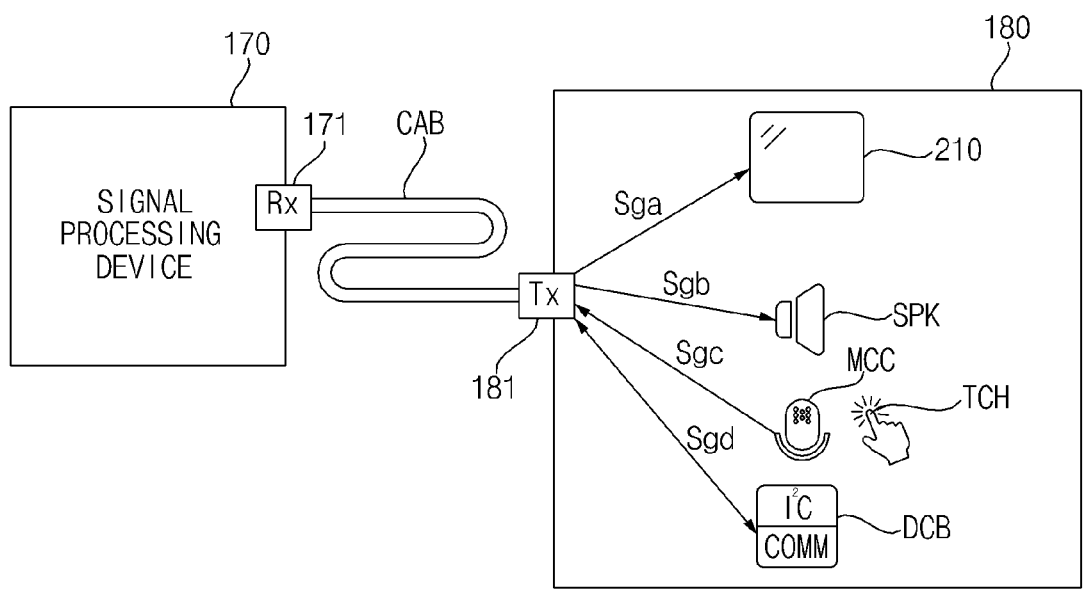
FIG. 6 is an example of an internal block diagram of an image display apparatus according to an embodiment of the present disclosure.

FIG. 6 is an example of an internal block diagram of an image display apparatus according to an embodiment of the present disclosure.

Referring to the drawings, an image display apparatus 100 according to an embodiment of the present disclosure includes a display 180 and a signal processing device 170 that outputs data to the display 180.

The display 180 may include a timing controller 232 that signal-processes video data from the signal processing device 170 and a panel 210 that displays an image based on a driving signal from the timing controller 232.

The panel 210 may include a liquid crystal display panel (LCD panel), an organic light emitting panel (OLED panel), an inorganic light emitting panel (LED panel), etc.

Meanwhile, the display 180 may include a speaker SPK for sound output, a microphone MCC for audio signal collection, a touch sensor TCH for touch input or body information sensing, and a display control bus DCB for display control.

The image display apparatus 100 according to an embodiment of the present disclosure may include one cable CAB for data transmission between the signal processing device 170 and the display 180.

Meanwhile, the cable CAB may be configured to transmit data including video data and audio data from the signal processing device 170 to the display 180. That is, the cable CAB may be configured to transmit data from the signal processing device 170 to the display 180 in a forward direction which is a first direction, by unidirectional communication.

Meanwhile, the cable CAB may be configured to transmit audio data, touch input data, or body information data from the display 180 to the signal processing device 170. That is, the cable CAB may be configured to transmit data from the display 180 to the signal processing device 170 in a reverse direction which is a second direction, by unidirectional communication.

Accordingly, it is possible to perform data transmission in the direction of the display 180 and data transmission in the direction of the signal processing device 170 through one cable CAB.

Meanwhile, the cable CAB may be configured to transmit an interface monitor signal and a system control bus signal through bidirectional communication. Accordingly, forward data transmission, reverse data transmission, and control data transmission are possible through one cable CAB. A description of the cable CAB will be described in more detail with reference to FIG. 7.

Figure 7:
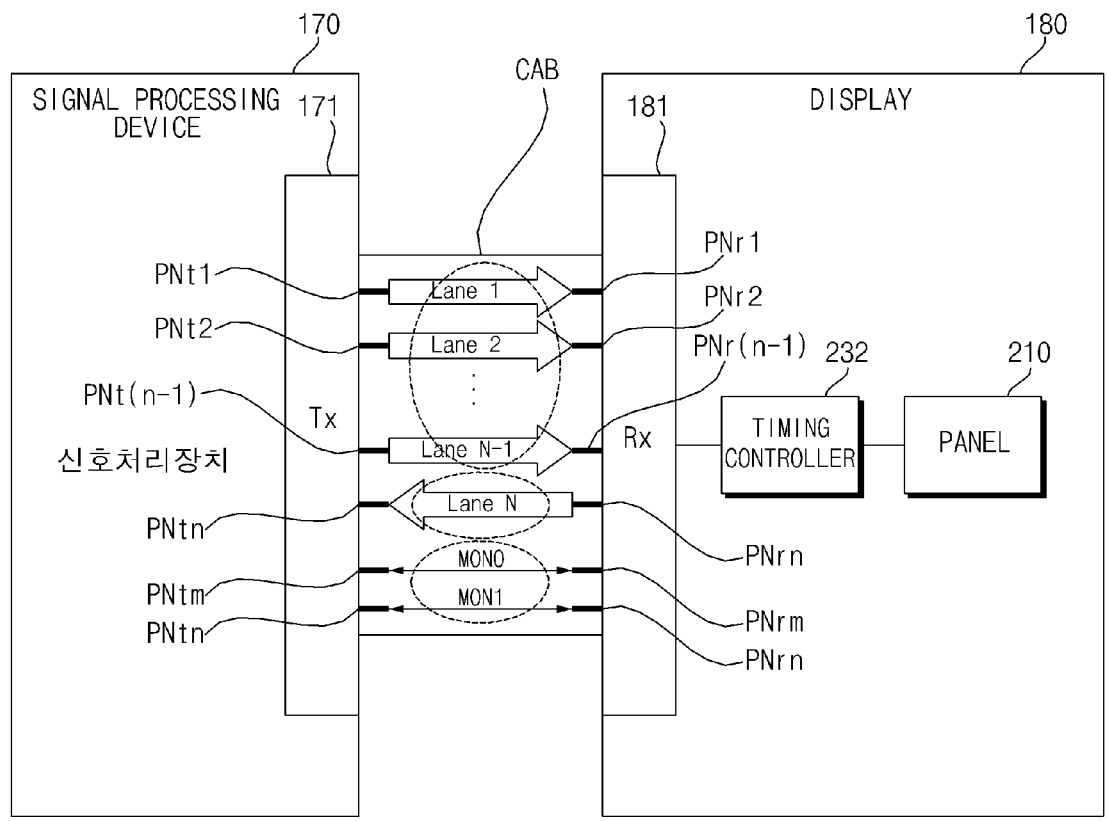
FIG. 7 is a diagram showing an interface between a signal processing device according to an embodiment of the present disclosure and a display.

FIG. 7 is a diagram illustrating an interface between a signal processing device and a display according to an embodiment of the present disclosure.

Referring to the drawing, the image display apparatus 100 according to an embodiment of the present disclosure may include one cable CAB to provide an interface for data transmission between the signal processing device 170 and the display 180.

A cable CAB according to an embodiment of the present disclosure may include a plurality of first direction communication lanes Lane 1 to Lane (N-1) and at least one second direction communication lane Lane N.

The first interface 171 in the signal processing device 170 according to an embodiment of the present disclosure transmits data to the second interface 181 in the display 180 by using a plurality of first direction communication lanes Lane 1 to Lane (N-1) and receives data from the second interface 181 in the display 180 by using at least one second direction communication lane Lane N. Accordingly, data transmission in the direction of the display 180 and data transmission in the direction of the signal processing device 170 can be performed through one cable CAB.

Meanwhile, as described in FIG. 1, in a case where a microphone or a touch sensor is mounted on the display 180, audio data, touch input data, or body information data by the microphone or touch sensor is transmitted from the display 180 to the signal processing device 170 by using at least one second direction communication lane Lane N within the cable CAB.

In this way, since transmission of audio data, touch input data, or body information data to the signal processing device 170 is performed through one cable CAB without a separate cable, interface efficiency is increased.

In addition to the plurality of first direction communication lanes Lane 1 to Lane (N-1) and the at least one second direction communication lane Lane N, the cable CAB according to an embodiment of the present disclosure may include a first transmission line MON0 and a second transmission line MON1, for bidirectional communication. Accordingly, forward data transmission, reverse data transmission, and control data transmission are possible through one cable CAB.

Meanwhile, the first transmission line MON0 and the second transmission line MON1 are transmission lines for transmitting control data and the like, and may correspond to the first terminal PNtm and second terminal PNtn of the signal processing device 170, respectively.

Meanwhile, the signal processing device 170 according to an embodiment of the present disclosure may include terminals PNt1 to PNtn corresponding to N lanes Lane 1 to Lane N, and a first terminal PNtm and second terminal PNtn for bidirectional communication.

Meanwhile, at least one of the first terminal PNtm and the second terminal PNtn may share an interface monitor signal and a system control bus signal. Accordingly, since integrated support of control data and the like is possible, cable (CAB) wiring can be simplified.

Similarly, the display 180 according to an embodiment of the present disclosure may include terminals PNr1 to PNrn corresponding to the N lanes Lane 1 to Lane N, and a third terminal PNrm and fourth terminal PNrn for bidirectional communication.

Compared to FIG. 5, there is no additional cable and the like, and the number of terminals in the signal processing device 170 and the display 180 is reduced by using the control terminals in an integrated manner, thereby increasing signal transmission efficiency and reducing power consumption loss. In addition, it is possible to efficiently transmit video data with increasing resolution.

Meanwhile, the data transmitted to the display 180 using the plurality of first direction communication lanes Lane 1 to Lane (N-1) may include video data DDa and audio data DDb. Accordingly, the audio data DDb can be transmitted to the display 180 in addition to the video data DDa.

Meanwhile, the data received by the signal processing device 170 by using the at least one second direction communication lane N may include audio data DDb or touch input data or body information data that is converted through a microphone in the display 180. Accordingly, it is possible to receive audio data DDb, touch input data, or body information data from the display 180 and process it.

Meanwhile, the plurality of first direction communication lanes Lane 1 to Lane (N-1) and the at least one second direction communication lane Lane N may be driven by unidirectional communication. Accordingly, it is possible to perform forward data transmission and reverse data transmission, respectively.

Meanwhile, the data transmission rate using the plurality of first direction communication lanes Lane 1 to Lane (N-1) may be a first rate, and the data transmission rate using the at least one second direction communication lane Lane N may be a second rate lower than the first rate. Accordingly, data based on low-speed data communication can be transmitted, and high-resolution based video data DDA can be transmitted according to high-speed data communication.

Meanwhile, compared to FIG. 5, the first interface 171 in the signal processing device 170 may be configured to pack N lanes of data into (N-1) lanes of data and output the packed (N-1) lanes of data.

In FIG. 5, N lanes Lane 1 to Lane N are used for forward data transmission, whereas, in FIG. 7 according to an embodiment of the present disclosure, N-1 lanes Lane 1 to Lane (N-1), out of N lanes, are used for forward data transmission, and the remaining one lane Lane N may be used for reverse data transmission. Thereby, it is possible to perform forward data transmission and reverse data transmission through one cable CAB, and as a result, data transmission can be performed efficiently.

To this end, the first interface 171 in the signal processing device 170 may be configured to reorder N lanes of data, pack the reordered data into reordered (N-1) lanes of data, and output the (N-1) lanes of data. Accordingly, reverse data transmission is possible through the remaining lane, and data transmission can be performed efficiently.

FIGS. 8 to 11F are diagrams referenced in the description of FIG. 7.

Figure 8:
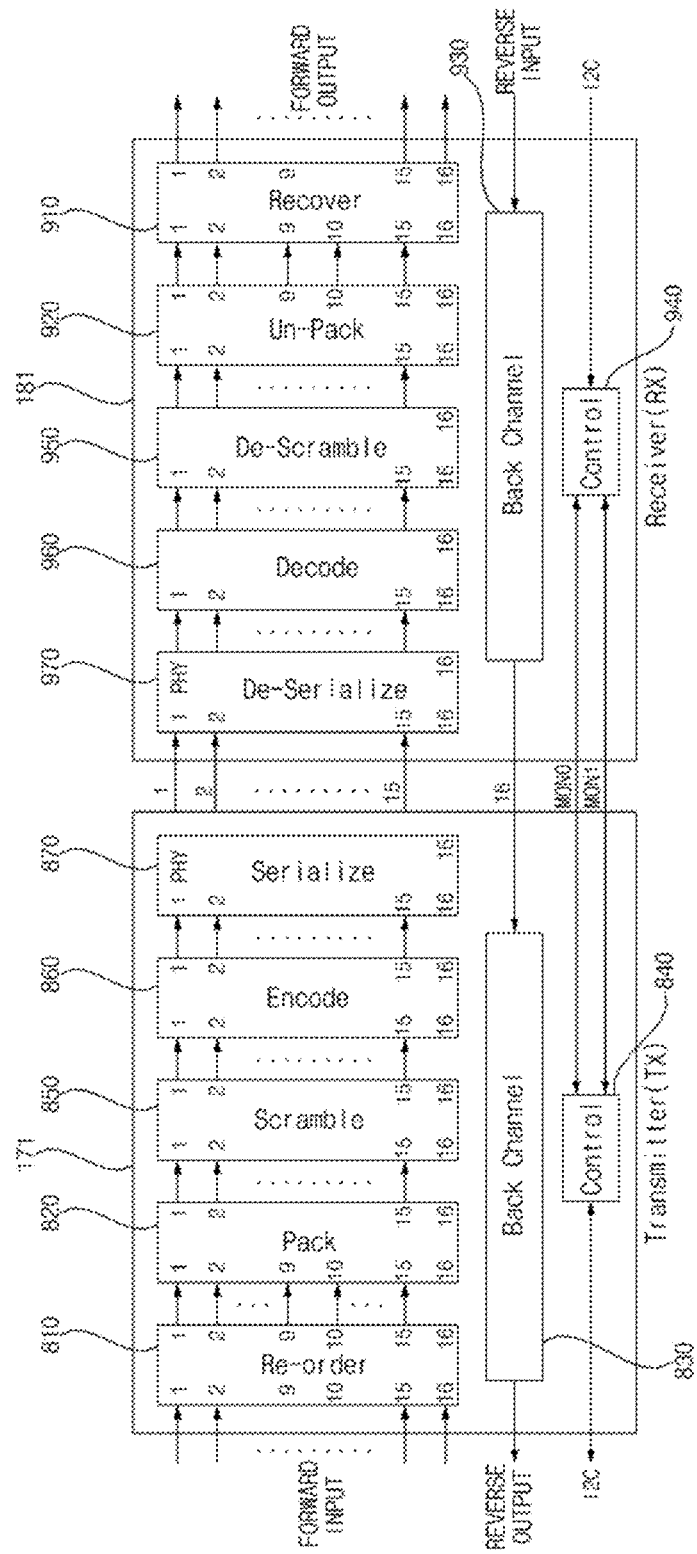
FIGS. 8 to 11F are diagrams referenced in the description of FIG. 7.

First, FIG. 8 is a diagram showing the inside of the first interface 171 in the signal processing device 170 and the inside of the second interface 181 in the display 180.

Referring to the figure, for forward data transmission, the first interface 171 in the signal processing device 170 reorders N lanes of data in (N-1) lanes of data (S810), packs the reordered data into reordered (N-1) lanes of data (S820), scrambles it (S850), encodes it (S860), and serializes it (S870) to output (N-1) lanes of data.

Correspondingly, for forward data reception, the second interface 181 in the display 180 deserializes (S970), decodes (S960), and descrambles the received (N-1) lanes of data (S950) and unpacks it into (N-1) lanes of data (S920) and restores the (N-1) lanes of data to N lanes of data (S910).

Next, the second interface 181 in the display performs processing in a back channel block for reverse data transmission (S930), and correspondingly, for reverse data reception, the first interface 171 in the signal processing device 170 performs signal processing in the back channel block (S830).

Next, a control block 840 in the first interface 171 in the signal processing device 170 integrates a control bus function for communication of an interface monitor signal and a general control signal, for bidirectional control data transmission or reception.

Correspondingly, a control block 90 in the second interface 181 in the display 180 integrates a control bus function for communication of an interface monitor signal and a general control signal, for bidirectional control data transmission and reception.

Figure 9A:
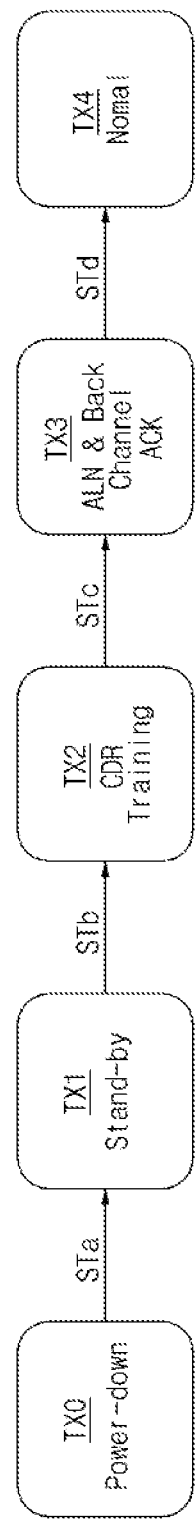

FIGS. 9A and 9B show state transition diagrams of the first interface 171 in the signal processing device 170 during data transmission.

Referring to the figures, the TX0 state represents a state in which the first interface 171 is powered down.

When powered on (STa), the first interface 171 transitions to a TX1 state, which is a standby mode state. At this time, the cable CAB is not connected.

The first interface 171 in the signal processing device 170 may determine whether the signal level of the first terminal PNtm is a low level, in order to check (STb) the state of the cable CAB, and, if the signal level is the low level, may be controlled to enter a first training mode (CDR training). Accordingly, it is possible to enter a TX2 state easily, which is the first training mode state.

Meanwhile, the first interface 171 in the signal processing device 170 may be configured to periodically transmit a clock signal during the first training mode and check (STc) whether the signal level of the first terminal PNtm is changed from the low level to a high level, and if so, may be controlled to enter a second training mode (Align Training). Accordingly, it is possible to enter a TX3 state easily, which is the second training mode state.

Meanwhile, the first interface 171 in the signal processing device 170 may make an align training attempt by transmitting an ALN pattern signal during the second training mode, and upon receiving (STd) an acknowledgement (ACK) signal after the transmission of the pattern signal, may be controlled to enter a normal mode. Accordingly, it is possible to enter a TX4 state easily, which is a normal mode state.

Meanwhile, according to the normal mode, the first interface 171 in the signal processing device 170 may be configured to transmit data 180 to the second interface 181 in the display 180 by using a plurality of first direction communication lanes Lane 1 to Lane (N-1), and transmit a system control bus signal by using a first terminal PNtm and a second terminal PNtn. Accordingly, it is possible to perform unidirectional data transmission and bidirectional control data transmission.

In this case, the unidirectional data transmission may include forward video data transmission, forward audio data transmission, or reverse audio data DDb or touch input data or body information data transmission.

Figure 10A:
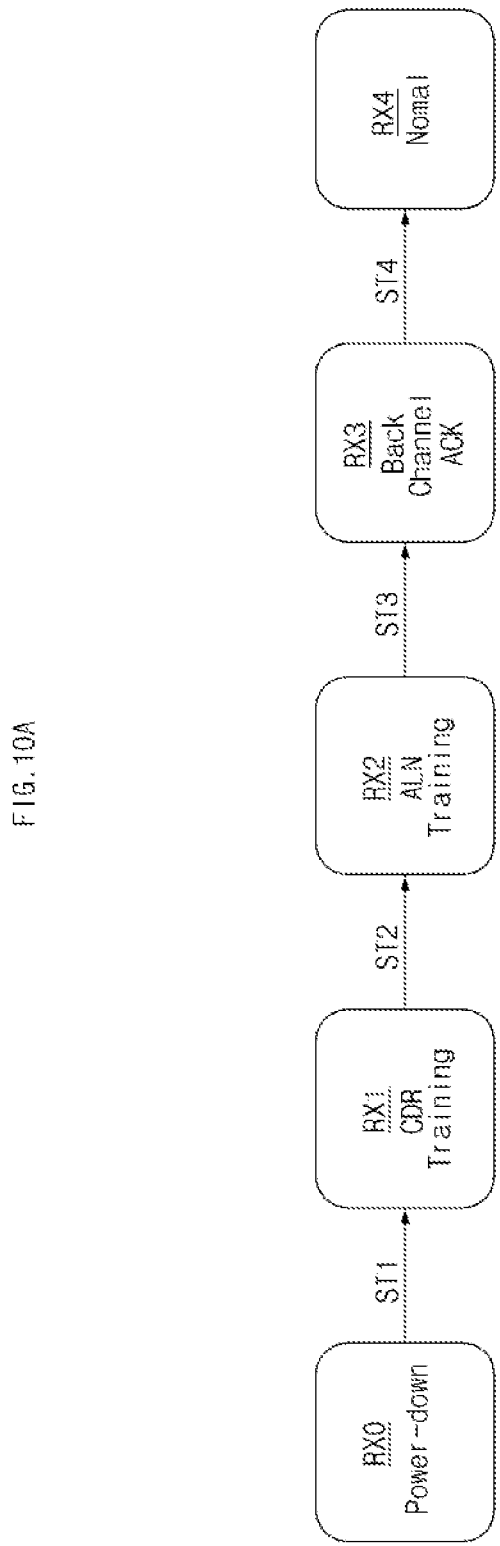

FIGS. 10A and 10B show state transition diagrams of the second interface 181 in the display 180 during data reception. FIGS. 10A and 10B may correspond to FIGS. 9A and 9B.

Referring to the figures, the RX0 state represents a state in which the first interface 171 is powered down.

When powered on (ST1), the first interface 171 and the second interface 181 in the display 180 are transitioned into an RX1 state in which the first training mode (CDR training) is performed, based on checking (ST2) of a clock pattern received through the cable CAB.

Meanwhile, upon completion (ST2) of the first training mode (CDR training), the second interface 181 in the display 180 may change the signal level of the third terminal PNrm to high level, and may be controlled to enter a second training mode (Align Training). Accordingly, it is possible to enter an RX2 state easily, which is a second training mode state.

Meanwhile, upon completion (ST3) of the pattern alignment, the second interface 181 in the display 180 may be controlled to enter an RX3 state for transmission of an acknowledgement (ACK) signal.

Meanwhile, the second interface 181 in the display 180 may be configured to transmit (STd) an acknowledgment (ACK) signal to notify that an align pattern has been found, during the RX3 state, and may be controlled to enter a normal mode. Accordingly, it is possible to enter an RX4 state easily, which is a normal mode state.

Meanwhile, according to the normal mode, the second interface 181 in the display 180 may receive data from the first interface 171 in the signal processing device 170 by using a plurality of first direction communication lanes Lane 1 to Lane (N-1), and receive a system control bus signal by using a first terminal PNtm and a second terminal PNtn. Accordingly, it is possible to perform unidirectional data reception and bidirectional control data transmission or reception.

Figure 11A:
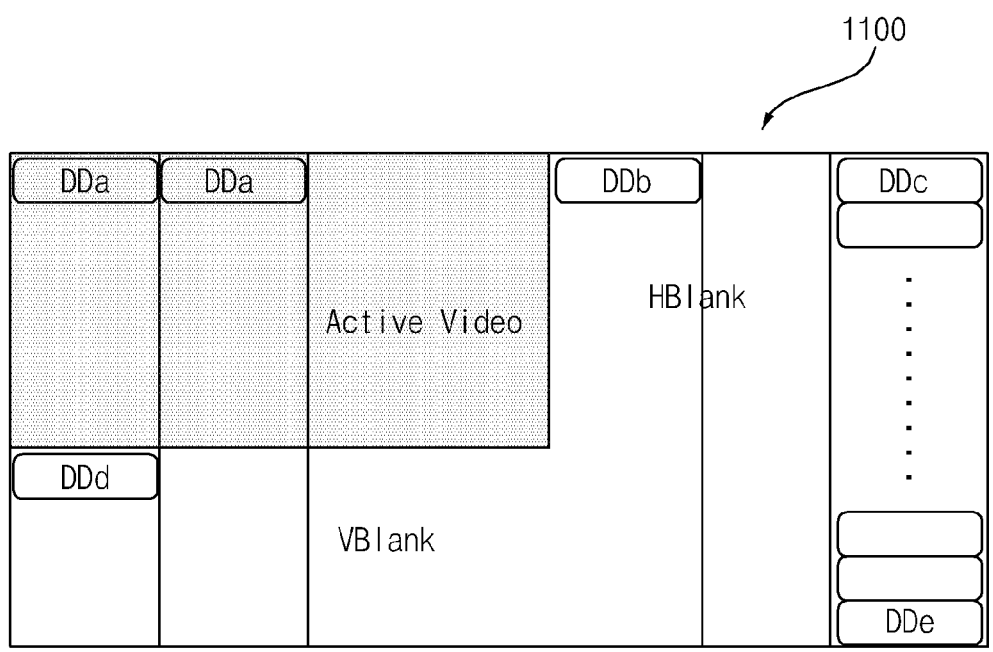

FIG. 11A illustrates a data frame 1110 transmitted through a plurality of first direction communication lanes Lane 1 to Lane (N-1).

Referring to the drawing, the first interface 171 in the signal processing device 170 outputs a data frame 1110 through a plurality of first direction communication lanes Lane 1 to Lane (N-1), and the data frame 1110 may include video data DDa, audio data DDb, line end information DDc, additional data DDd, and frame end information DDe. Accordingly, the data frame 1110 can be efficiently transmitted.

In an active area of the data frame 1110, the video data DDa is arranged and transmitted.

In a horizontal blank area in the data frame 1110, the audio data DDb is arranged and transmitted.

The line end information DDc is the last of each line constituting the data frame 1110, which informs that a new line starts after it and stores information for restoring an HSync signal.

The additional data DDd is a vertical blank area and may include data desired by the user.

The frame end information DDe is the last segment of the data frame 1110, which informs that a new frame starts after it and stores information for restoring the VSync signal.

Meanwhile, the data frame 1110 does not include a data enable signal DE, a vertical synchronization signal Vsync, and a horizontal synchronization signal Hsync.

That is, the first interface 171 in the signal processing device 170 does not transmit in real time the data enable signal DE, the vertical synchronization signal Vsync, and the horizontal synchronization signal Hsync, which are control signals, collect and group a number of pixels into a segment, and define and use the end of a data line and the end of a data frame by using a segment having a specific value. Accordingly, it is possible to efficiently transmit data.

For example, the first interface 171 in the signal processing device 170 does not use the original data enable signal DE of video data, but extends the data enable signal DE and transmits the video data until the H Blank period of the extended data enable signal (Extended DE).

Meanwhile, in order to restore the extended data enable signal (Extended DE), the first interface 171 in the signal processing device 170 packs pixel data for each lane to include pixel preamble bits.

Correspondingly, the second interface 181 of the display 180 combines pixel preamble bits for each lane and uses them as a pixel identifier.

Figure 11B:
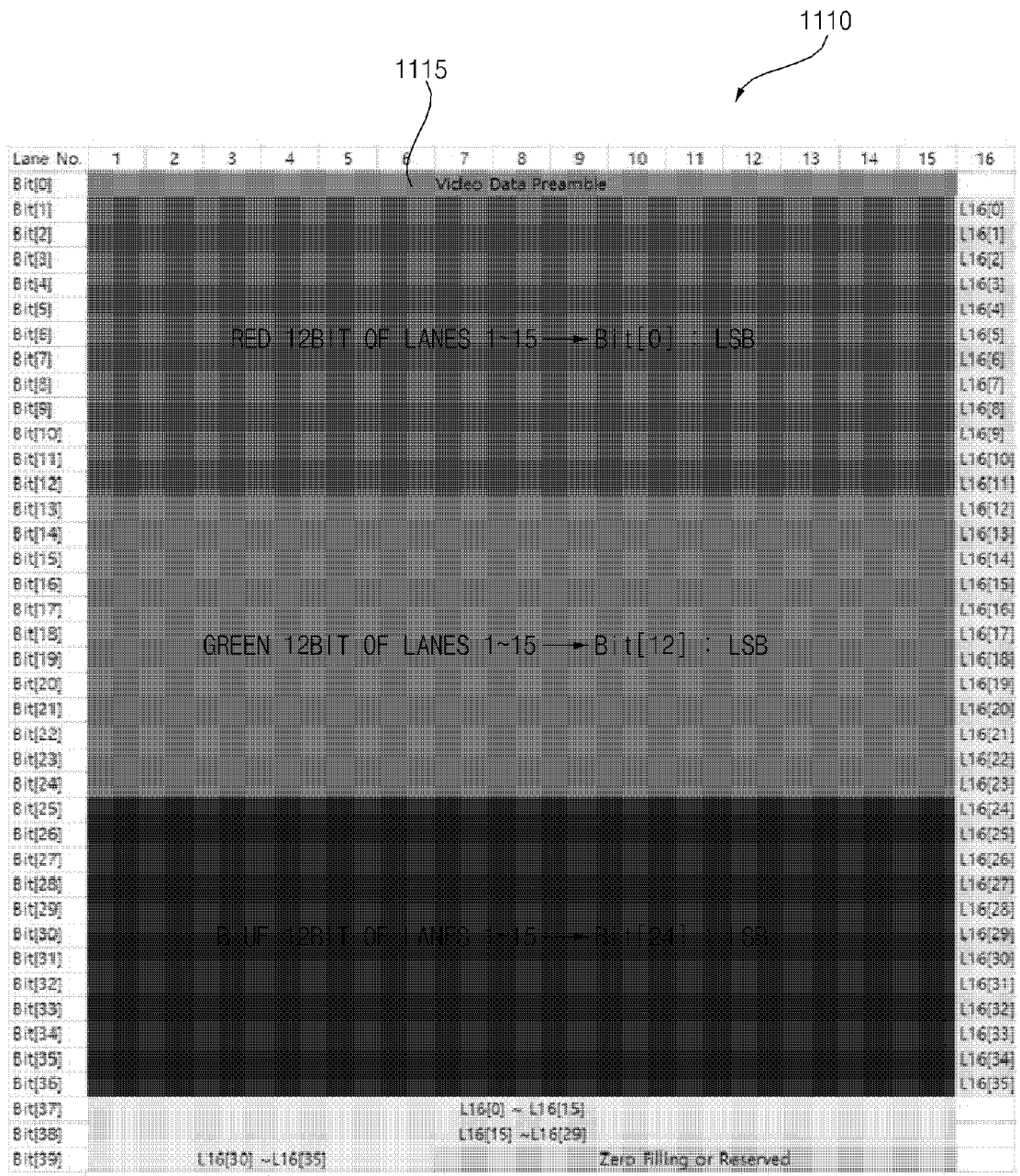

FIG. 11B is a diagram showing active area mapping in the data frame 1110 of FIG. 11A.

Referring to the figure, the video data 1110 in the data frame 1110 may include preamble data 1115 and RGB data. Accordingly, the video data 1110 can be efficiently transmitted.

The drawing shows a process in which the video data 1110 is bundled and transmitted in a total of 40 bits and segments for 16 lane pixels are compressed into 15 lanes.

Meanwhile, when the bits of the RGB data are less than a first reference number of bits, the first interface 171 in the signal processing device 170 may be configured to transmit the RGB data by padding lower-order bits with zero.

For example, the RGB data may be configured to transmit a color resolution of up to 12 bits, and if the first reference number of bits is less than 12 bits, the color resolution may be transmitted by padding lower-order bits with zero. Accordingly, it is possible to efficiently transmit the RGB data.

Meanwhile, the first bit of each lane is allocated as preamble data 1115 indicating that it is video data, which can be known when all bits are normally restored from the data of each lane.

Meanwhile, the second interface 181 in the display 180 may receive the video data DDa in the data frame 1110 of FIG. 11B without the data enable signal DE and restore the preamble data 1115 to define an image area and restore and build the image.

Figure 11C:
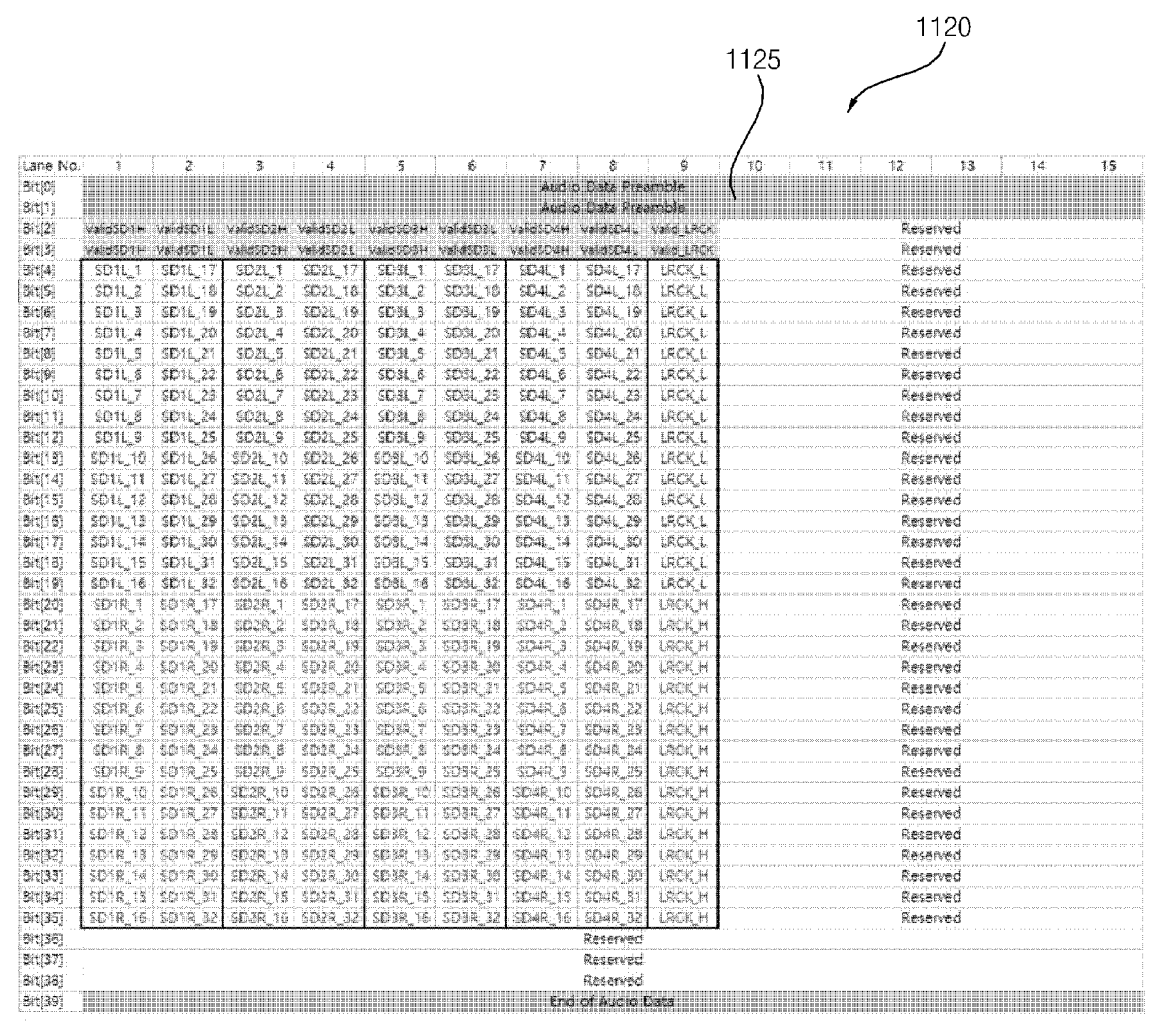

FIG. 11C is a diagram showing mapping of audio data to a H Blank period in the data frame 1110 of FIG. 11A.

Referring to the drawing, the audio data 1120 in the data frame 1110 may include preamble data 1125, bit information data, and audio bit data. Accordingly, the audio data 1120 can be efficiently transmitted.

The first interface 171 in the signal processing device 170 may be configured to pack audio in I2S format.

The figure exemplifies packing of 32-bit 8-channel audio data.

The second interface 181 in the display 180 may use the preamble data 1125 to identify an audio data area.

Meanwhile, it is determined whether to use next audio data according to ValidSDnH and ValidSDnL in the audio data DDb.

For example, if {ValidSDnH, ValidSDnL}='10', it may indicate that 16-bit audio is used, and if {ValidSDnH, ValidSDnL}='11', it may indicate that 32-bit audio is used.

Meanwhile, in the case of using 24-bit audio data, the lower-order 8 bits can be discarded.

On the other hand, if 8-channel audio data is not required, only a valid signal of a desired channel may be set to '1', and the rest may be set to '0'.

Figure 11D:
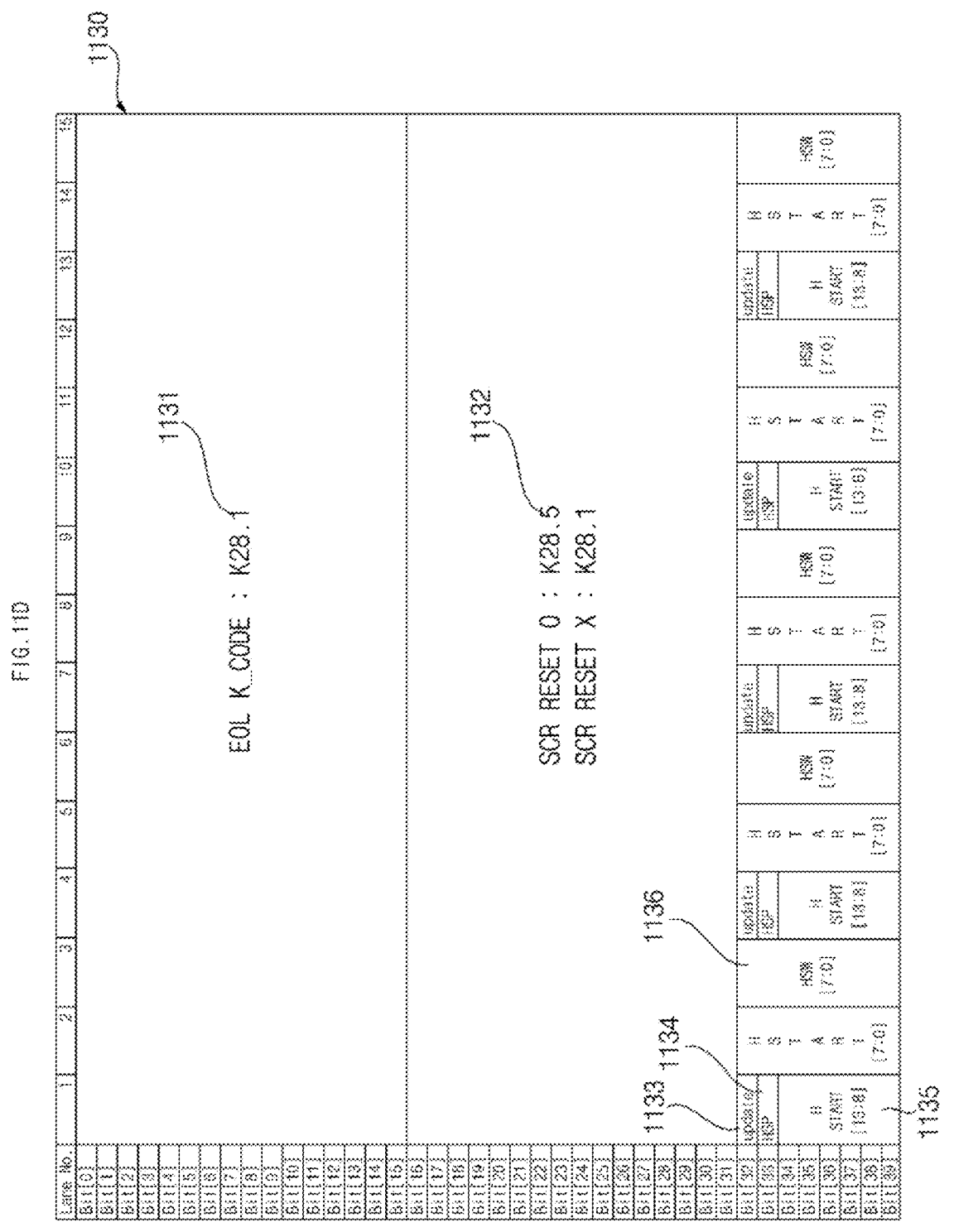

FIG. 11D is a diagram showing a configuration example of line end information 1130 in the data frame 1110 of FIG. 11A.

Referring to the drawing, the line end information 1130 in the data frame 1110 includes line end data 1131, scrambler reset data 1132, update data 1133, horizontal synchronization polarity information 1134, length information 1135, and width information 1136 of the horizontal synchronization signal. Accordingly, it is possible to efficiently transmit the line end information 1130.

The line end data (EOL K_CODE) 1131 indicates that one video line ends and a new line starts.

The scrambler reset data (SCR RESET) 1132 may select whether to reset the scrambler at the rear end.

The update data (update) 1133 indicates whether HSync creation information has been updated.

For example, when updated, it is used to generate HSync of the next line, and responds to bit error occurrence by transmitting the same data in units of 3 lanes.

That is, when an error occurs, data on other lanes is used. Here, the error means a decoder error or a packing error.

The horizontal synchronization polarity information (HSP) 1134 indicates HSync Polarity information. For example, if it is 1'b0, it may indicate Active Low, and if it is 1'b1, it may indicate Active High.

The length information (HSTART) may indicate length information from an End of Line (EoL) signal to an HSync edge.

The width information (HSW) of the horizontal synchronization signal may represent length (width) information of the HSync signal.

Figure 11E:
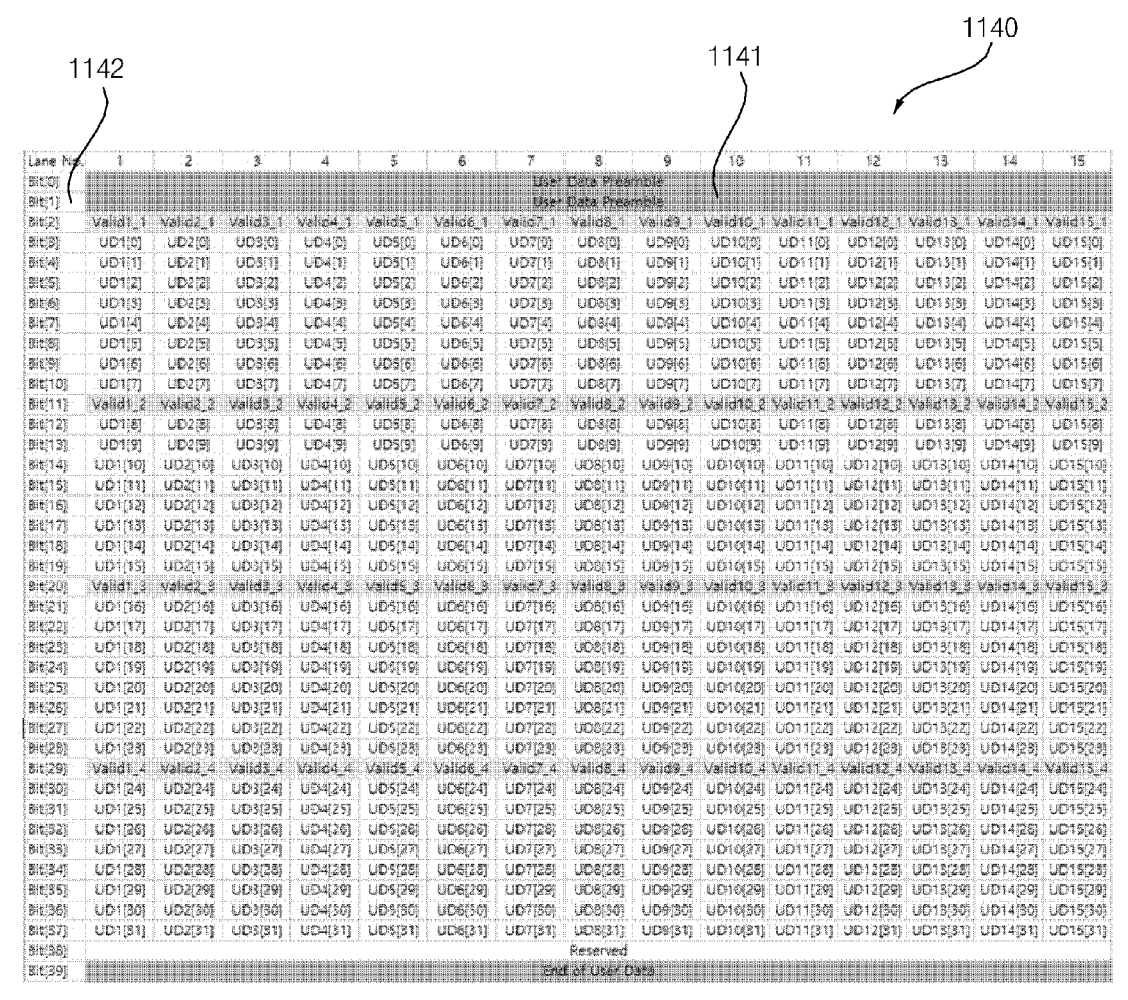

FIG. 11E is a diagram illustrating mapping of additional data 1140 to a blank (V Blank) period in the data frame 1110 of FIG. 11A.

Referring to the drawing, the additional data 1140 in the data frame 1110 may include preamble data 1125 and data usage information. Accordingly, it is possible to efficiently transmit the additional data 1140.

Meanwhile, the additional data DDd may also be referred to as user data.

Meanwhile, the first interface 171 in the signal processing device 170 may be configured to map additional data DDd to a blank period in the data frame 1110 and transmit the additional data DDd. Accordingly, it is possible to efficiently transmit the additional data DDd.

Meanwhile, the first interface 171 in the signal processing device 170 can transmit up to 60 bytes per segment, and the total data bandwidth (BW) when transmitting a 60 Hz frame may be 89.1 Mbps (4K resolution) or 356.4 Mbps (8K resolution).

On the other hand, the first interface 171 in the signal processing device 170 may divide and transmit each data in bytes as needed.

Meanwhile, the second interface 181 in the display 180 may identify a user data area by using a user data preamble which is the preamble data 1125.

Meanwhile, according to each Validn_n ( ) whether to use the following data is determined, and available data BW may be flexibly set according to the supported hardware and purpose.

FIG. 11F is a diagram showing an example of the configuration of frame end information 1150 in the data frame 1110 of FIG. 11A.

Referring to the drawing, the frame end information 1150 in the data frame 1110 may include frame end data 1151, scrambler reset data 1152, update data 1153, vertical synchronization polarity information 1154, length information 1155, and width information 1156 of the vertical synchronization signal. Accordingly, the frame end information 1150 can be efficiently transmitted.

The frame end information 1150 in the data frame 1110 may include frame end data 1151, scrambler reset data 1152, update data 1153, vertical synchronization polarity information 1154, length information 1155, and width information 1156 of the vertical synchronization signal. Accordingly, it is possible to efficiently transmit the frame end information DDc.

The frame end data (EOF K_CODE) 1151 indicates that one video frame ends and a new frame starts.

The scrambler reset data (SCR RESET) 1152 may select whether to reset the scrambler at the rear end.

The update data (update) 1153 indicates whether VSync generation information has been updated.

For example, when updated, it is used to create VSync of the next frame and responds to bit error occurrence by transmitting the same data in units of 3 lanes.

That is, when an error occurs, data on other lanes is used. Here, the error means a decoder error or a packing error.

The vertical synchronization polarity information (VSP) 1154 indicates VSync polarity information. For example, if it is 1'b0, it may indicate Active Low, and if it is 1'b1, it may indicate Active High.

The length information VSTART may indicate length information from an End-of-Frame (EoF) signal to a VSync edge.

The width information (VSW) of the vertical synchronization signal may indicate length (width) information of the VSync signal.

Figure 12:
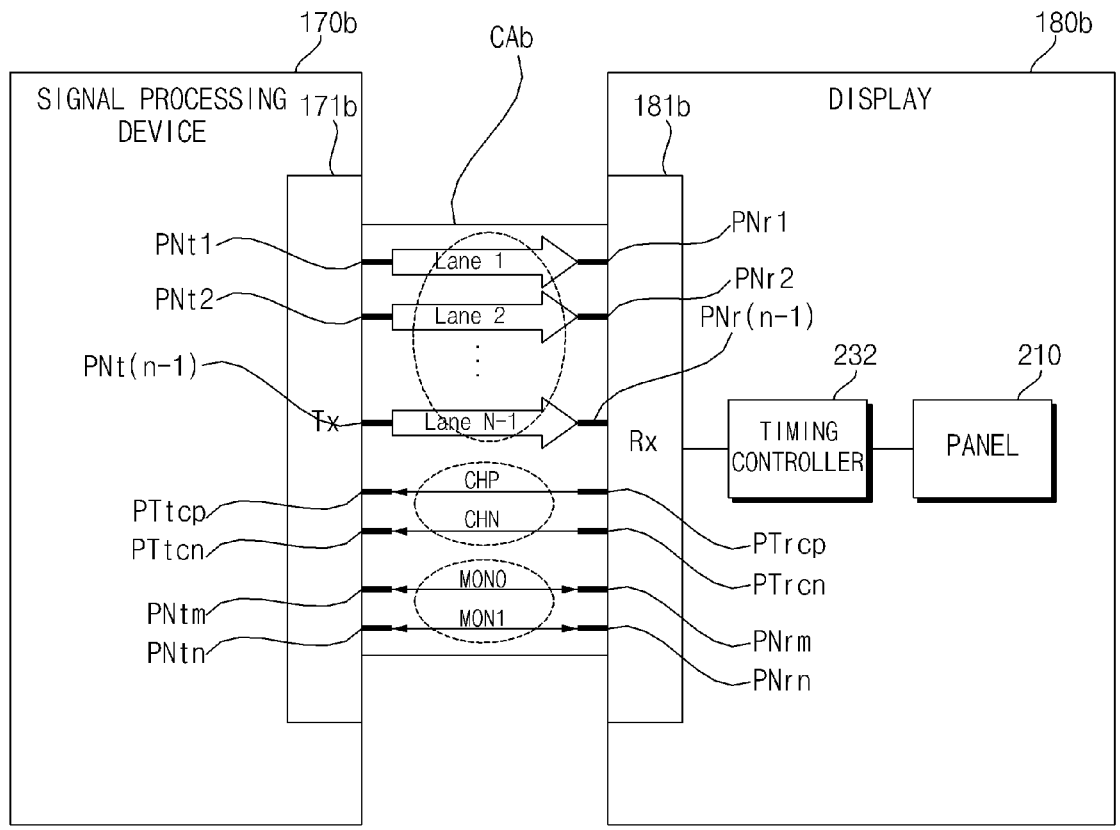
FIG. 12 is a diagram showing an interface between a signal processing device according to another embodiment of the present disclosure and a display.

FIG. 12 is a diagram illustrating an interface between a signal processing device and a display according to another embodiment of the present disclosure.

Referring to the drawing, an image display apparatus 100b according to another embodiment of the present disclosure may include one cable CABb to provide an interface for data transmission between a signal processing device 170b and a display 180b.

A cable CABb according to another embodiment of the present disclosure includes a plurality of first direction communication lanes Lane 1 to Lane (N-1) and a first transmission line CHP and second transmission line CHN for second direction communication.

The first interface 171b in the signal processing device 170b according to another embodiment of the present disclosure transmits data to the second interface 181b in the display 180b by using a plurality of first direction communication lanes Lane 1 to Lane (N-1) and receives data from the second interface 181b in the display 180b by using the first transmission line CHP and the second transmission line CHN. Accordingly, data transmission in the direction of the display 180b and data transmission in the direction of the signal processing device 170b can be performed through one cable CABb.

Meanwhile, as described in FIG. 1, in a case where a microphone or a touch sensor is mounted on the display 180b, audio data, touch input data, or body information data by the microphone or touch sensor is transmitted from the display 180b to the signal processing device 170b by using the first transmission line CHP and the second transmission line CHN.

In this way, since transmission of audio data, touch input data, or body information data to the signal processing device 170b is performed through one cable CABb without a separate cable, interface efficiency is increased.

In addition to the plurality of first direction communication lanes Lane 1 to Lane (N-1), the first transmission line CHP, and the second transmission line CHN, the cable CABb according to another embodiment of the present disclosure may include a third transmission line MON0 and a fourth transmission line MON1, for bidirectional communication. Accordingly, forward data transmission, reverse data transmission, and control data transmission are possible through one cable CABb.

Meanwhile, the signal processing device 170b according to another embodiment of the present disclosure may include terminals PNt1 to PNt(n-1) corresponding to (N-1) lanes Lane 1 to Lane (N-1), a first terminal PNtcp and a second terminal PNten, and a third terminal PNtm and fourth terminal PNtn for bidirectional communication.

The first transmission line CHP and the second transmission line CHN are transmission lines for reverse data transmission, and may correspond to the first terminal PNtcp and second terminal PNten of the signal processing device 170b, respectively.

Meanwhile, the third transmission line MON0 and the fourth transmission line MON1 are transmission lines for transmitting control data and the like, and may correspond to the third terminal PNtm and fourth terminal PNtn of the signal processing device 170b, respectively.

Meanwhile, at least one of the third terminal PNtm and the fourth terminal PNtn may share an interface monitor signal and a system control bus signal. Accordingly, since integrated support of control data and the like is possible, cable (CABb) wiring can be simplified.

Similarly, the display 180b according to another embodiment of the present disclosure may include terminals PNr1 to PNr(n-1) corresponding to the (N-1) lanes Lane 1 to Lane (N-1), terminals PTrcp and PTren for reverse data transmission, and terminals PNrm and PNrn for bidirectional communication.

Compared to FIG. 5, there is no additional cable and the like, and the number of terminals in the signal processing device 170b and the display 180b is reduced by using the control terminals in an integrated manner, thereby increasing signal transmission efficiency and reducing power consumption loss. In addition, it is possible to efficiently transmit video data with increasing resolution.

Meanwhile, the data transmitted to the display 180b using the plurality of first direction communication lanes Lane 1 to Lane (N-1) may include video data DDa and audio data DDb. Accordingly, the audio data DDb can be transmitted to the display 180b in addition to the video data DDa.

Meanwhile, the data received by the signal processing device 170b using the first transmission line CHP and the second transmission line CHN may include audio data DDb or touch input data or body information data that is converted through a microphone in the display 180b. Accordingly, it is possible to receive audio data DDb, touch input data, or body information data from the display 180b and process it.

Meanwhile, the plurality of first direction communication lanes Lane 1 to Lane (N-1), the first transmission line CHP, and the second transmission line CHN may be driven by unidirectional communication. Accordingly, it is possible to perform forward data transmission and reverse data transmission, respectively.

Meanwhile, the data transmission rate using the plurality of first direction communication lanes Lane 1 to Lane (N-1) may be a first rate, and the data transmission rate using the at least one second direction communication lane Lane N may be a second rate lower than the first rate. Accordingly, data based on low-speed data communication can be transmitted, and high-resolution based video data DDa can be transmitted according to high-speed data communication.

Meanwhile, compared to FIG. 5, the first interface 171b in the signal processing device 170b may be configured to pack N lanes of data into (N-1) lanes of data and output the packed (N-1) lanes of data.

In FIG. 5, N lanes Lane 1 to Lane N are used for forward data transmission, whereas, in FIG. 12 according to an embodiment of the present disclosure, N-1 lanes Lane 1 to Lane (N-1), out of N lanes, are used for forward data transmission. Thereby, it is possible to perform forward data transmission and reverse data transmission through one cable CABb, and as a result, data transmission can be performed efficiently.

To this end, the first interface 171b in the signal processing device 170b may be configured to reorder N lanes of data, pack the reordered (N-1) lanes of data, and output the (N-1) lanes of data. Accordingly, reverse data transmission is possible through the remaining lane, and data transmission can be performed efficiently.

Meanwhile, the first transmission line CHP and the second transmission line CHN may be implemented by making 1 lane used as a differential pair single-ended.

Figure 13:
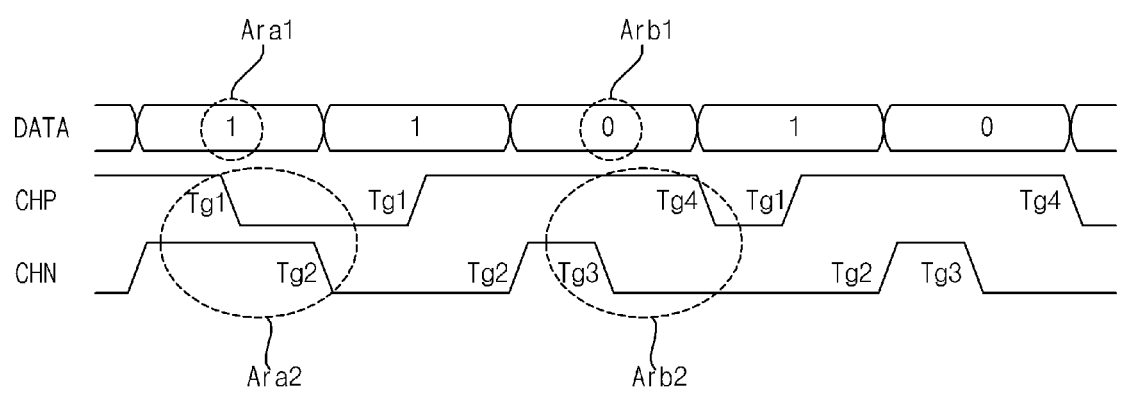
Figure 14:
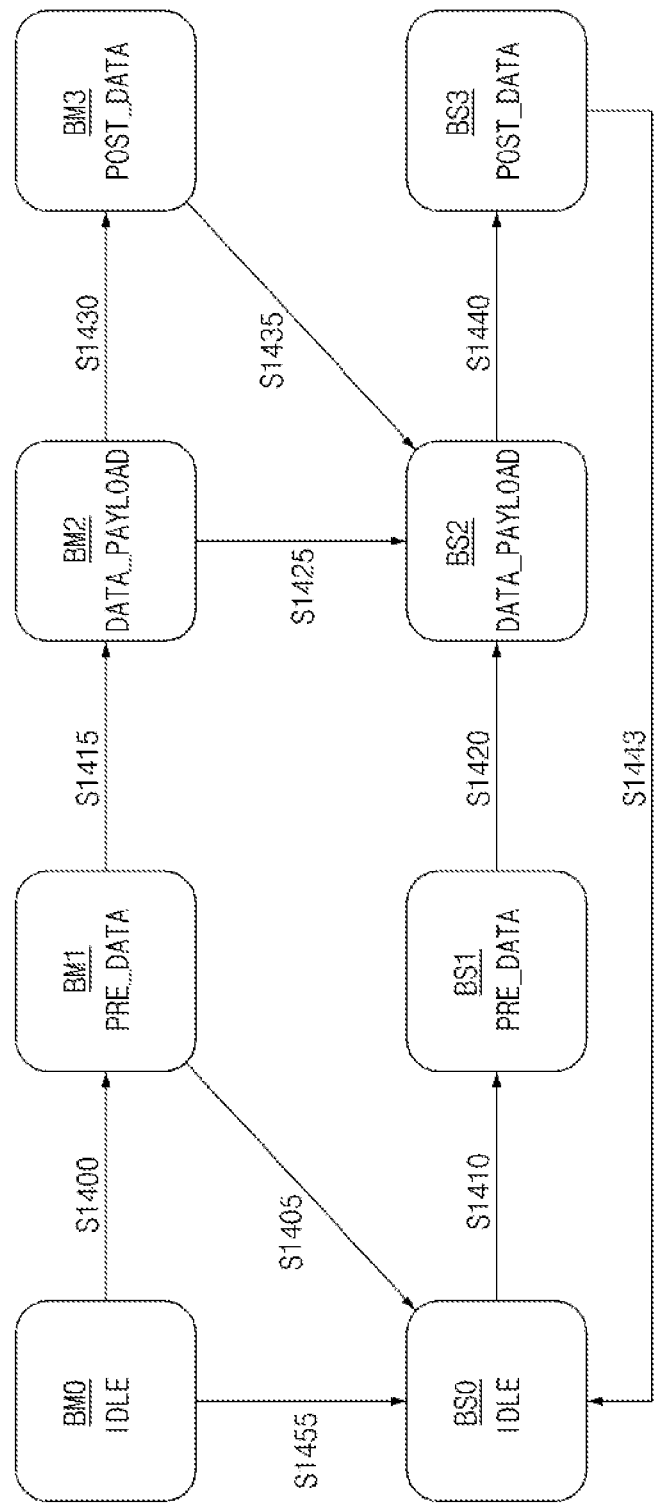

FIGS. 13 to 15 are diagrams referenced in the description of FIG. 12.

FIG. 13 is a diagram showing signaling used for the first transmission line CHP and second transmission line CHN of FIG. 12.

Referring to the figure, the first interface 171b in the signal processing device 170b includes a first terminal PTtcp for receiving a first reverse signal SCHP and a second terminal PTtcp for receiving a second reverse signal SCHN.

FIG. 13 illustrates a data signal DATA received through the first interface 171b in the signal processing device 170b and reverse signals SCHP and SCHN received through the first transmission line CHP and the second transmission line CHN, respectively.

For example, upon receiving '1' bit (Ara1) of the data signal DATA, the first reverse signal SCHP may be toggled in 180 degrees out of phase with the clock, and the second reverse signal may be toggled (Ara2) after 180 degrees of phase difference from the clock, and upon receiving '0' bit (Arb1), the second reverse signal SCHN may be toggled in 180 degrees out of phase with the clock, and the first reverse signal may be toggled (Ara2) after 180 degrees of phase difference from the clock. Accordingly, it is possible to receive a reverse signal.

FIG. 14 illustrates an overall flowchart of reverse data communication in FIG. 12.

In the drawing, BM may correspond to the second interface 181b of the display 180b, and BS may correspond to the first interface 171b in the signal processing device 170b.

Meanwhile, the first interface 171b in the signal processing device 170b may receive data from the second interface 181b in the display 180b, the data being divided into an idle period in which reverse data is not received, a pre data period in which clocks and data type information are transmitted, a payload period in which the reverse data is transmitted, and a post data period in which a counter is reset. Accordingly, it is possible to receive a reverse signal.

In the IDLE period in which reverse data is not received by the first interface 171b in the signal processing device 170b, the second interface 181b of the display 180b may be configured to transmit pre data (S1405).

The pre data may include clocks and data type information.

Accordingly, the first interface 171b in the signal processing device 170b may detect a toggle as shown in FIG. 13 through the first transmission line CHP and the second transmission line CHN (S1410).

Upon receiving the pre data, the first interface 171b in the signal processing device 170b checks the pre data (S1420).

Meanwhile, upon completion (S1415) of the transmission of the pre data, the second interface 181b of the display 180b transmits a data payload (S1425).

That is, after completion of the transmission of the pre data, the second interface 181b of the display 180b transmits reverse data to be actually transmitted.

Accordingly, the first interface 171b in the signal processing device 170b receives reverse data.

In this case, the reverse data may include audio data, touch input data, or body information data.

Meanwhile, upon completion (S1430) of the transmission of the data payload, the second interface 181b of the display 180b transmits post data (S1435).

Accordingly, the first interface 171b in the signal processing device 170b receives the post data (S1435).

Meanwhile, the first interface 171b in the signal processing device 170b checks the post data (S1440).

Meanwhile, the first interface 171b in the signal processing device 170b may check for an additional clock provided to it and reset a counter used for the next transmission, in order to facilitate data recovery when checking the post data. (S1443).

Next, when there is no data transmission from the second interface 181b of the display 180b, the first interface 171b in the signal processing device 170b enters an idle state (S1455).

FIG. 15 is a diagram referenced to describe operations of the first transmission line MON0 and the second transmission line MON1 for bidirectional communication in FIG. 7 or FIG. 12.

Referring to the drawing, CLka, DTa, and SLKa respectively illustrate signals on the system control bus lines SCL and SDA and the interface control signal line LOCKN in FIG. 5.

Meanwhile, CLkb and SLKb in the drawing represent examples of signals supplied to the first transmission line MON0 in FIG. 7 or FIG. 12, and DTb represents a signal supplied to the second transmission line MON1 in FIG. 7 or FIG. 12.

In an embodiment of the present disclosure, at least one of the first terminal PNtm and the second terminal PNtn may share an interface monitor signal and a system control bus signal.

In particular, the first terminal PNtm may share a clock signal and a lock signal. Accordingly, since integrated support of control data and the like is possible, cable (CAB) wiring can be simplified.

Conventionally, a clock signal CLk flows through the system control bus line SCL, and a lock signal SLKa separately flows through the interface control signal line LOCKN.

In an embodiment of the present disclosure, in order to reduce the number of terminals, the first terminal PNtm may receive an I2C clock signal CLKb and an interface lock signal SLKb.

Meanwhile, the second terminal PNtn in the first interface 171b may receive I2C protocol data through the first transmission line MON0. Accordingly, control data can be transmitted or received through bidirectional communication.

On the other hand, upon receiving a clock signal CLKb by the first terminal PNtm in the first interface 171b, the first interface 171b may determine that the clock signal CLKb is the I2C clock signal CLKb, and upon receiving a low-level signal after a trigger signal TR1 by the first terminal PNtm in the first interface 171b, the first interface 171b may determine that the low-level signal after the trigger signal TR1 is the lock signal SLKb. Accordingly, the clock signal CLKb and the lock signal SLKb can be received separately through the first terminal PNtm.

In particular, when determining the trigger signal TR1, level triggering may be used, not edge triggering.

Meanwhile, the first interface 171b may measure the length of a low level period P3 after the trigger signal TR1 to determine whether a lock signal exists. For example, when the length of the low level period P3 after the trigger signal TR1 is equal to or longer than a reference period, it may be deemed to be a lock signal.

Meanwhile, the first interface 171b may give priority to the lock signal SLKb between the clock signal CLKb and the lock signal SLKb. Accordingly, the signal processing device 170b may be notified preferentially of an interface state.

While the present disclosure has been particularly shown and described with reference to exemplary embodiments thereof, the present disclosure is not limited to the specific embodiments described above. it is obvious that various modifications may be made by those skilled in the art, to which the present disclosure pertains without departing from the gist of the present disclosure, which is claimed in the claims, and such modified embodiments should not be individually understood from the technical spirit or prospect of the present disclosure.

What is claimed is:

1. An image display apparatus comprising:
   a display; and
   a signal processing device configured to output data to the display,
   wherein a first interface in the signal processing device is configured to transmit the data to a second interface in the display by using a plurality of first direction communication lanes, and receive data from the second interface in the display by using at least one second direction communication lane,
   wherein the first interface in the signal processing device includes a first terminal and a second terminal, for bidirectional communication, and,
   wherein after powered on, in a standby mode, the first interface is configured to determine whether a signal level of the first terminal is a low level, and in response to the signal level being the low level, enter a first training mode,
   wherein the first interface in the signal processing device is configured to periodically transmit a clock signal during the first training mode, and, when the signal level of the first terminal is changed from the low level to a high level, enter a second training mode,
   wherein the first interface in the signal processing device is configured to output a data frame through the plurality of first direction communication lanes,
   wherein the data frame includes video data, audio data, line end information, additional data, and frame end information,
   wherein the video data in the data frame includes preamble data and RGB data,
   wherein, when a number of bits of the RGB data are less than a first reference number of bits, the first interface in the signal processing device is configured to transmit the RGB data by padding lower-order bits with zero.

2. The image display apparatus of claim 1, wherein the data transmitted to the display by using the plurality of first direction communication lanes includes video data and audio data.

3. The image display apparatus of claim 1, wherein the data received by the signal processing device by using the at least one second direction communication lane includes audio data converted through a microphone in the display or touch input data or body information data.

4. The image display apparatus of claim 1, wherein the plurality of first direction communication lanes and the at least one second direction communication lane are driven by unidirectional communication.

5. The image display apparatus of claim 1, wherein the data transmission rate using the plurality of first direction communication lanes is a first rate, and the data transmission rate using the at least one second direction communication lane is a second rate lower than the first rate.

6. The image display apparatus of claim 1, wherein the first interface in the signal processing device includes a first terminal and a second terminal, for bidirectional communication, wherein at least one of the first or second terminals shares an interface monitor signal and a system control bus signal.

7. The image display apparatus of claim 6, wherein the plurality of first direction communication lanes, the at least one second direction communication lane, and first and second transmission lanes respectively corresponding to the first and second terminals are disposed in the same cable.

8. The image display apparatus of claim 1, wherein the first interface in the signal processing device is configured to pack N lanes of data into (N-1) lanes of data and output the packed (N-1) lanes of data.

9. The image display apparatus of claim 1, wherein the first interface in the signal processing device is configured to reorder N lanes of data, pack the reordered data into (N-1) lanes of data, and output the packed (N-1) lanes of data.

10. The image display apparatus of claim 1, wherein the first interface in the signal processing device is configured to transmit a pattern signal during the second training mode, and upon receiving an acknowledgement signal after the transmission of the pattern signal, transmit the data to the second interface in the display by using the plurality of first direction communication lanes, and transmit the system control bus signal by using the first terminal and the second terminal.

11. The image display apparatus of claim 1, wherein the data frame does not include a data enable signal, a vertical synchronization signal, and a horizontal synchronization signal.

12. An image display apparatus comprising:
a display; and
a signal processing device configured to output data to the display,
wherein a first interface in the signal processing device is configured to transmit the data to a second interface in the display by using a plurality of first direction communication lanes, and
wherein the first interface includes a terminal for receiving a first reverse signal and a terminal for receiving a second reverse signal,
wherein when the first interface in the signal processing device is configured to receive "1" bit, the first reverse signal is toggled in 180 degrees out of phase with clock, and the second reverse signal is toggled after 180 degrees of phase difference from the clock, and,
wherein when the first interface in the signal processing device is configured to receive '0' bit, the second reverse signal is toggled in 180 degrees out of phase with the clock, and the first reverse signal is toggled after 180 degrees of phase difference from the clock,
wherein the first interface in the signal processing device is configured to output a data frame through the plurality of first direction communication lanes,
wherein the data frame includes video data, audio data, line end information, additional data, and frame end information,
wherein the video data in the data frame includes preamble data and RGB data,
wherein, when a number of bits of the RGB data are less than a first reference number of bits, the first interface in the signal processing device is configured to transmit the RGB data by padding lower-order bits with zero.

13. The image display apparatus of claim 12, wherein the first interface in the signal processing device is configured to receive data from the second interface in the display, the data being divided into an idle period in which reverse data is not received, a pre data period in which clocks and data type information are transmitted, a payload period in which the reverse data is transmitted, and a post data period in which a counter is reset.

14. The image display apparatus of claim 12, wherein the first interface in the signal processing device includes a first terminal and a second terminal, for bidirectional communication,
wherein the first terminal in the first interface receives an I2C clock signal and an interface lock signal, and the second terminal in the first interface receives I2C protocol data.

15. The image display apparatus of claim 14, wherein, upon receiving a clock signal by the first terminal in the first interface, the first interface is configured to determine whether the clock signal is the I2C clock signal or not, and upon receiving a low-level signal after a trigger signal by the first terminal in the first interface, the first interface is configured to determine whether the low-level signal after the trigger signal is the lock signal or not.

* * * * *